(12) United States Patent
Iversen et al.

(10) Patent No.: US 11,434,933 B2
(45) Date of Patent: Sep. 6, 2022

(54) PRESSURE REDUCTION IN HIGH PRESSURE PROCESSING SYSTEM

(71) Applicant: STEEPER ENERGY APS, Hørsholm (DK)

(72) Inventors: Steen Brummerstedt Iversen, Vedbæk (DK); Henrik Egholm, Hjørring (DK)

(73) Assignee: STEEPER ENERGY APS, Hørsholm (DK)

(*) Notice: Subject to any disclaimer, the term of this patent is extended or adjusted under 35 U.S.C. 154(b) by 499 days.

(21) Appl. No.: 16/484,151

(22) PCT Filed: Feb. 8, 2018

(86) PCT No.: PCT/EP2018/053179
§ 371 (c)(1),
(2) Date: Aug. 7, 2019

(87) PCT Pub. No.: WO2018/146195
PCT Pub. Date: Aug. 16, 2018

(65) Prior Publication Data
US 2020/0040886 A1    Feb. 6, 2020

(30) Foreign Application Priority Data
Feb. 8, 2017  (DK) .............................. PA201770074

(51) Int. Cl.
*F15B 3/00* (2006.01)
*C10G 1/00* (2006.01)
(Continued)

(52) U.S. Cl.
CPC ................ *F15B 3/00* (2013.01); *C10G 1/002* (2013.01); *G05D 16/00* (2013.01);
(Continued)

(58) Field of Classification Search
CPC ........................................................ F15B 3/00
See application file for complete search history.

(56) References Cited

U.S. PATENT DOCUMENTS

| 3,444,689 A | 5/1969 | Budzich |
| 4,112,679 A | 9/1978 | Budzich |
| 4,211,345 A * | 7/1980 | Taubenmann ...... B01F 15/0237 222/134 |

(Continued)

FOREIGN PATENT DOCUMENTS

| WO | WO 2012/167789 A2 | 12/2012 |
| WO | WO 2014/181283 A1 | 11/2014 |
| WO | 2016/004958 | † 1/2016 |

OTHER PUBLICATIONS

Ib Johannsen et al., Hydrothermal Liquefaction of biomass: a pilot plant, Feb. 26, 2016, Biofuels International (vol. 10, issue 2) p. 63-65, Woodcote Ltd.†

*Primary Examiner* — Michael Leslie
(74) *Attorney, Agent, or Firm* — Birch, Stewart, Kolasch & Birch, LLP

(57) ABSTRACT

The invention relates to a pressure reduction unit for use in processing equipment handling high pressure fluid, where the pressure reduction unit comprises at least one inlet and an outlet, the pressure reduction unit being adapted to receive a pressurized fluid at process pressure level at the inlet, being adapted to isolate the received pressurized fluid from the upstream process and from the outlet and being adapted to reduce the pressure of the fluid to a lower predetermined level and further being adapted to output the fluid through the outlet while still isolated towards the upstream process.

20 Claims, 12 Drawing Sheets

(51) Int. Cl.
    *G05D 16/20*     (2006.01)
    *G05D 16/00*     (2006.01)
    *F04B 9/117*     (2006.01)

(52) U.S. Cl.
    CPC ........ *G05D 16/2006* (2013.01); *F04B 9/1172* (2013.01); *F15B 2211/528* (2013.01)

(56) References Cited

U.S. PATENT DOCUMENTS

| | | | |
|---|---|---|---|
| 5,454,408 A | 10/1995 | DiBella et al. | |
| 5,634,338 A | 6/1997 | Matsuda et al. | |
| 6,116,138 A * | 9/2000 | Achten | F04B 1/2042 |
| | | | 417/225 |
| 6,460,333 B2 * | 10/2002 | Endsley | F04B 1/2042 |
| | | | 60/419 |
| 7,028,470 B1 * | 4/2006 | Achten | F04B 1/2042 |
| | | | 60/419 |
| 10,108,207 B2 * | 10/2018 | Iversen | G05D 16/204 |
| 10,525,441 B2 * | 1/2020 | Iversen | B01J 19/0013 |
| 2005/0069425 A1 | 3/2005 | Gray et al. | |
| 2005/0254980 A1 | 11/2005 | Hedman | |
| 2009/0000674 A1 | 1/2009 | Jacobsen et al. | |
| 2011/0197752 A1 * | 8/2011 | Hugelman | F04B 25/04 |
| | | | 92/12.2 |
| 2014/0099691 A1 * | 4/2014 | Iversen | C10G 1/065 |
| | | | 435/166 |
| 2016/0333273 A1 | 11/2016 | Iversen | |
| 2019/0377372 A1 * | 12/2019 | Iversen | G05D 16/2093 |

\* cited by examiner
† cited by third party

PRESSURE REDUCTION IN HIGH PRESSURE PROCESSING SYSTEM

FIELD OF THE INVENTION

The present invention relates to the area of pressure reduction systems, in particular pressure reduction systems for use in high-pressure continuous processing systems, where a need for reduction of the high process pressure to a lower pressure is present.

BACKGROUND OF THE INVENTION

Numerous applications of high-pressure continuous processes exist or are under development or in early stages of commercialization. Examples of such processes are hydrothermal and solvothermal processes e.g. for production of hydrocarbons such as transportation fuels, lubricants, speciality chemicals, gases, carbonized products and nanomaterials.

In connection with continuously operating such high-pressure process systems the high pressure must be relieved at the end of the process and for this purpose a number of solutions have been suggested.

Normally when operating high pressure processing systems, a pressure reduction may be carried out using a number of pressure reduction valves and/or orifices/nozzles, arranged in series and/or in parallel. However, whereas such control valves and/or orifices are commonly used for smaller $\Delta P$ and often clean fluids. A disadvantage limiting such systems is that they are two-dimensional. If used in higher $\Delta P$ applications the velocities either gets very high and the pressure let down system is worn out very quickly due to erosion even when using hard ceramic coatings such as tungsten carbide or gets excessively expensive due to multiple steps required for such two-dimensional pressure let down systems. Further when used in a process where an abrasive substance is processed, it result in an even faster wear of the valve sealing surfaces, resulting in frequent requirement for refurbishing or changing of the valves.

Other conventional systems for pressure let down include lock hopper systems, where a receiving vessel, or lock hopper, is equalized in pressure with e.g. reactor by opening a shut off valve. The receiving vessel is then shut off from the reactor and depressurized into one or more subsequent vessels. At least two parallel receiving vessel lines are needed so that one can be loaded while the others are unloaded. The disadvantage of such systems is that the pressure loss in the first stage needs to be relatively small in order to not fluctuating the process pressure and that the shut off valves must be operated frequently and incur rapid wear, particularly at high pressure when cycles are short. Further such type of device does not operate in a truly continuous manner.

Another known method involves pressure reduction by running the processed substance through a number of tubular members and optionally a control valve for fine tuning (Iversen, WO2014/181,283). This system is three dimensional as it also uses the length dimension, and therefore allow for lower velocities through the pressure let down system and hence are more resistant to wear.

Common for high pressure process equipment using these known methods and equipment is that the wear may still be significant due to the content of abrasive material in the flowing liquid and since the flow velocity over the pressure reduction devices is significant. As a result the known pressure reduction systems may be unreliable and hence making the entire high pressure processing system unreliable.

OBJECTIVE OF THE INVENTION

The object of the present invention is to therefore provide for a pressure reduction unit, a pressure reduction arrangement as well as a method of operating such units and arrangements that increases the reliability of the pressure reduction system and hence the reliability of the process system into which it is implemented.

DESCRIPTION OF THE INVENTION

According to one aspect of the present invention the objective of the invention is achieved through a pressure reduction unit for use in processing equipment handling high pressure fluid, where the pressure reduction unit comprises at least one inlet and an outlet, the pressure reduction unit being adapted to receive a pressurized fluid at process pressure level at the inlet, being adapted to isolate the received pressurized fluid from the upstream process and from the outlet and being adapted to reduce the pressure of the fluid to a lower predetermined level and further being adapted to output the fluid through the outlet while still isolated towards the upstream process.

By applying a pressure reduction device in the manner defined it is possible to achieve a reduced flow velocity and hence reduce the wear of the parts, resulting in a more reliable pressure reduction system and a more reliable overall processing system.

In an embodiment the pressure reduction unit comprises an actuated valve at the inlet and an actuated valve at the outlet and between the inlet valve and the outlet valve a de-pressurization device. The use of actuated valves is enabled by using a depressurization device having a low stroke speed (large stroke volume).

Preferably means are provided for measuring the pressure upstream the inlet valve, between the inlet valve and the outlet valve and downstream the outlet valve.

In one embodiment a position indicator is provided indicating the cycle position of the pressure reduction device and being adapted to provide a control signal for opening or closing at least one valve in the pressure reduction system.

In an embodiment the pressure reduction unit comprises a pressure reduction device comprising a cylinder and a piston as well as means for driving the piston inside the cylinder.

In a further embodiment the pressure reduction unit may further comprise a control system, where the control system is adapted to allow opening of the valves when a certain maximum pressure difference is present on either side of the valve to be opened.

Advantageously the pressure reduction system is capable of operating in a manner where the inlet valve after having allowed inflow of a feed stream is closed for a period before the outlet valve is opened, hereby allowing the pressure to be reduced in the pressure reduction device.

Advantageously the pressure reduction system is capable of operating in a manner where the outlet valve is closed for a period before the inlet valve is opened, hereby allowing pressure to be generated in the pressure reduction device.

Hereby the overlap of closed inlet and outlet valves may correspond to between 5 and 30% of the working cycle, preferably between 10 and 20% of the working cycle.

The invention relates in a further aspect to a pressure reduction arrangement comprising two or more pressure reduction units according to any of the preceding claims, the pressure reduction devices being arranged in parallel and/or in series.

Hereby the working cycles of the pressure reduction units are preferably distributed evenly corresponding to the number of pressure reduction units.

Advantageously a position indicator is provided for a pressure reduction device, indicating the cycle position in the device and being adapted to provide a control signal for controlling the distribution of the pressure reduction unit cycles.

In a further aspect of the invention a method is foreseen where the method comprises entering a volume of pressurized fluid into a pressure reduction device closing the entry of pressurized fluid and expanding the entered volume to a desired pressure level by increasing the pressure reduction device volume, removing the fluid at the desired pressure level from the pressure reduction device by reducing the pressure reduction device volume.

Hereby the speed of the pump is preferably in the range 5-50 cycles per minute, preferably 5-25, most preferred 5-15 cycles per minute.

In an embodiment the pressure reduction unit or arrangement further comprises an energy reservoir, where the pressure reduction device is operatively connected to the reservoir and where at least part of the energy absorbed by the pressure reduction device is converted and transferred to the reservoir for successive utilization.

Hereby the energy reservoir may drive a pressurization pump adapted to pressurize the fluid on the input side of the processing equipment or the energy reservoir may drive a low pressure turbine connected to a generator generating electrical energy.

Due to loss in the system a further pressurization pump may be provided for supplying additional pressure to the input side of the processing equipment in order to compensate for loss of pressure energy in the system Advantageously the pressure reduction unit or the pressure reduction arrangement may include a cooling device for at least part of the pressure reduction devices, in particular for sealing areas of the pressure reduction devices.

BRIEF DESCRIPTION OF THE DRAWINGS

The invention will in the following be described with reference to one embodiment illustrated in the drawings where.

DESCRIPTION OF AN EMBODIMENT

Figure 1:
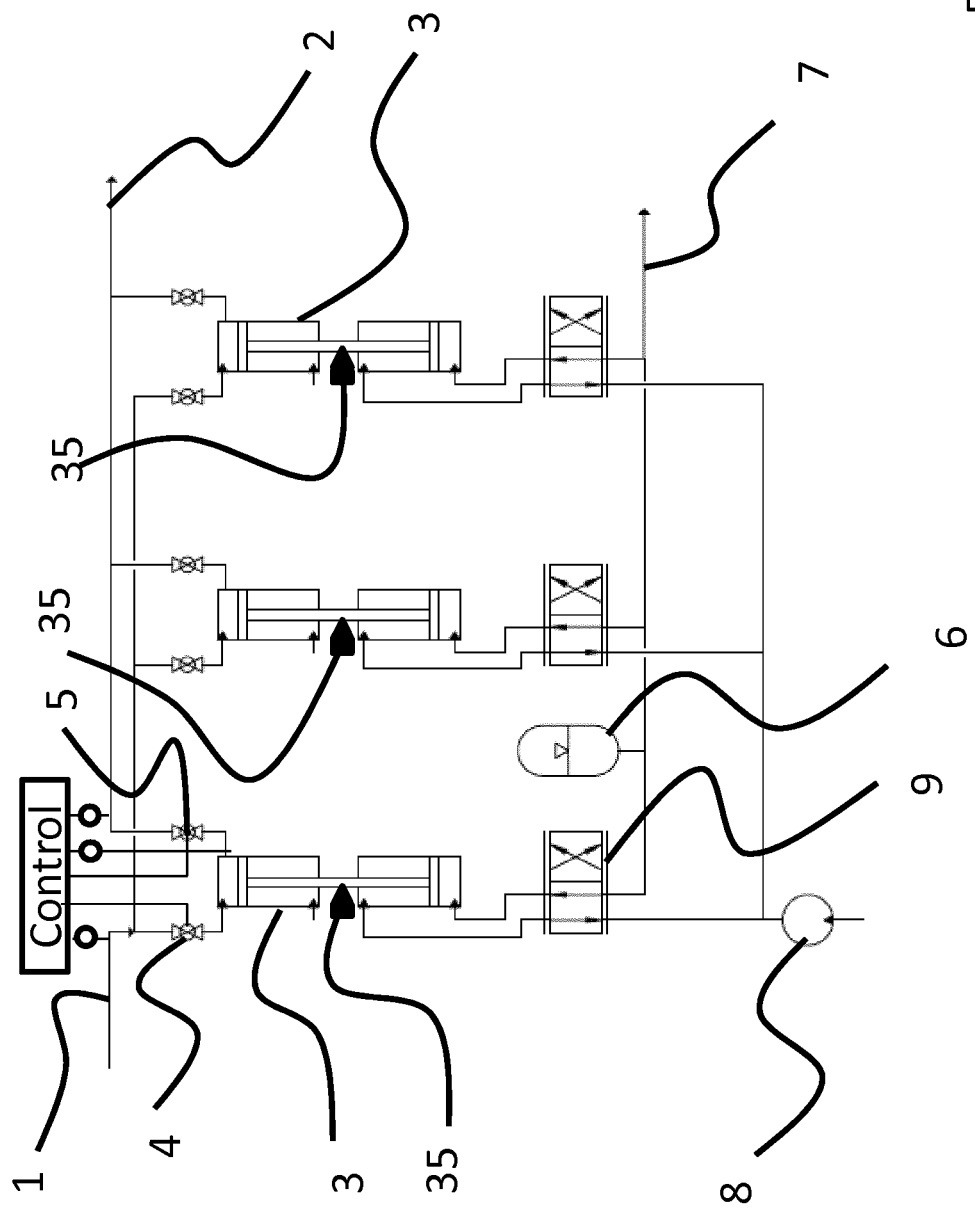
FIG. 1 shows a schematic overview of a first embodiment of a pressure reduction system according to the invention.

From FIG. 1 a first arrangement according to the invention is shown. The pressure reduction arrangement comprises three pumps 3, each with a high pressure inlet 1 and a lower pressure outlet 2 for a process stream. The inlet and the outlet are controlled by valves 4,5. The pump 3 as such is a piston pump with a certain stroke. The piston in the main cylinder is connected to an actuator cylinder capable of exercising a pressure on the piston or conveying the pressure from the high pressure process stream into storage 6. Pressure supply to operate the pump for part of its operation is supplied through 8 and controlled by valve 9. The recovered energy may be conveyed through conduit 7. Further a position indicator 35 is shown, which will be able to indicate the position of the piston, and which again may be used to calculate the cylinder volume at a given position. Pressure transducers are provided upstream, between and downstream the valves 4,5 and are connected to a controller that will be able to provide control signals to the valves 4,5 regarding opening and closing of these based on the input from the pressure transducers and a predetermined control strategy.

Figure 2:
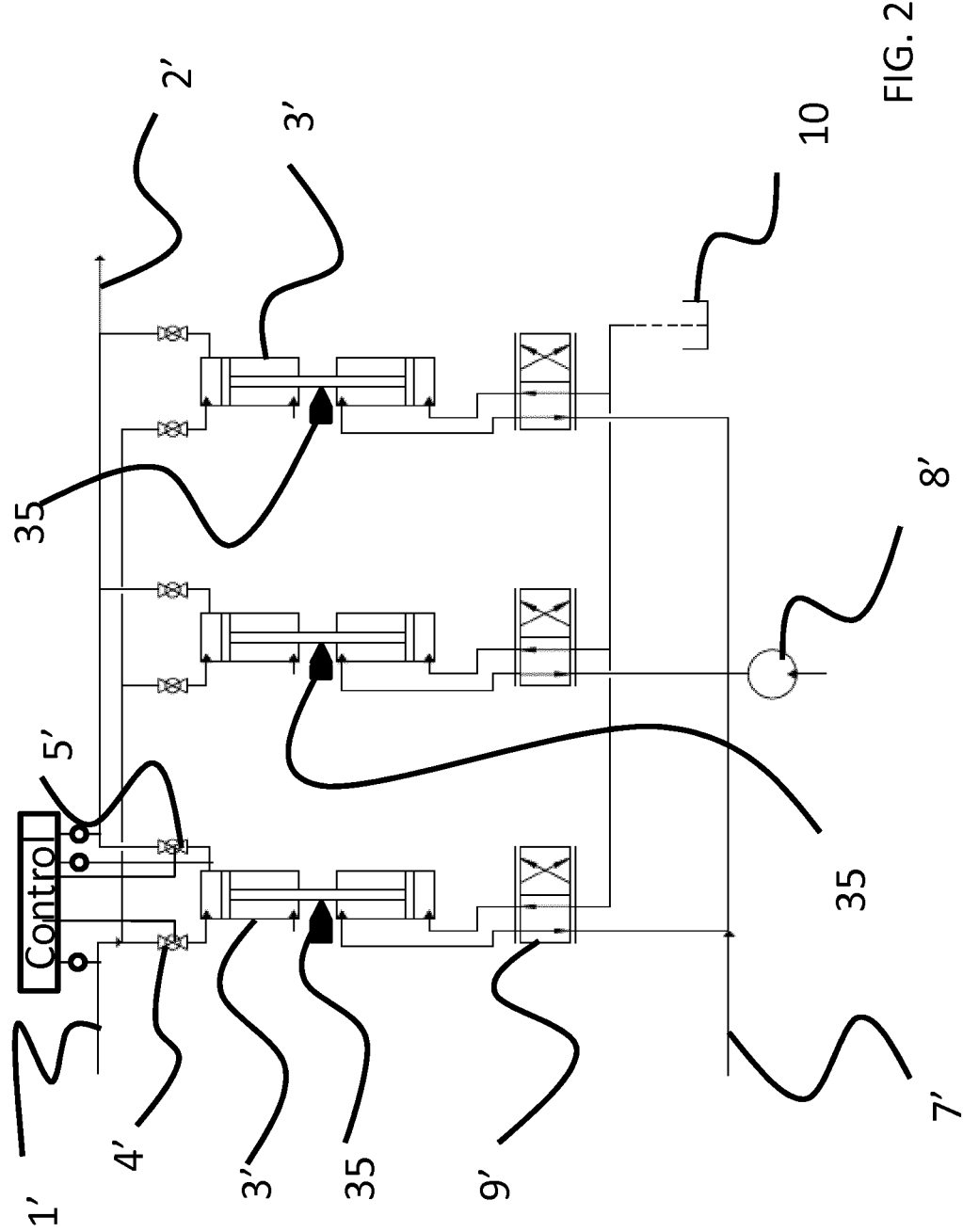
FIG. 2 shows a schematic overview of an embodiment of a pressurization system to be used in a system incorporating a pressure reduction system according to the invention.

From FIG. 2 a pressurization pump arrangement is shown. The pump arrangement comprises three pumps 3' adapted to receive a feed stream 1' of material to be processed at a relatively low pressure and successively pressurizing the feed stream to a significantly higher process pressure feed stream 2'. The inlet and outlet to and from the pressurization pump 3' are controlled by actuated valves 4',5'. Pressure is supplied through supply lines 7',8' through control valves 9'.

The pressurization pumps 3' may be driven entirely by a force generated by hydraulic pumps or by electrical motors. Alternatively or as a supplement, energy absorbed from the pressure reduction process described above in connection with FIG. 1 may be used to provide for at least part 7' of the pressurization of the feed stream. Further a position indicator 35 is shown, which will be able to indicate the position of the piston, and which again may be used to calculate the cylinder volume at a given position. Pressure transducers are provided upstream, between and downstream the valves 4',5' and are connected to a controller that will be able to provide control signals to the valves 4',5' regarding opening and closing of these based on the input from the pressure transducers and a predetermined control strategy.

Figure 3:
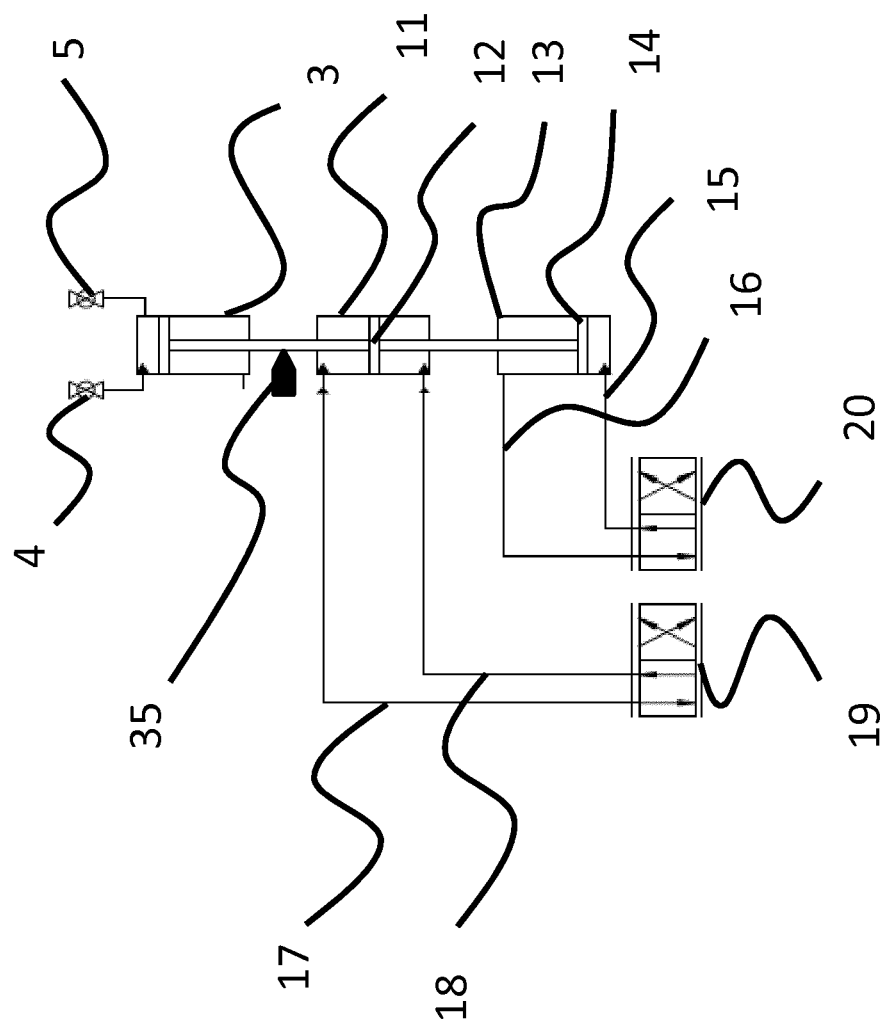
FIG. 3 shows a schematic overview of a further embodiment of a pressure reduction system according to the invention.

From FIG. 3 a single unit de-pressurization pump appears. The unit comprises a pump cylinder 3, a servo cylinder 11 and a control cylinder 13. The servo cylinder at the piston 12 in this is driven by pressure from energy recovery and the control cylinder 13 with its piston 14 is driven by pressure from a high pressure hydraulic pump. Pressure is supplied and recovered through supply lines 15,16,17,18 controlled by valves 19,20.

Figure 4:
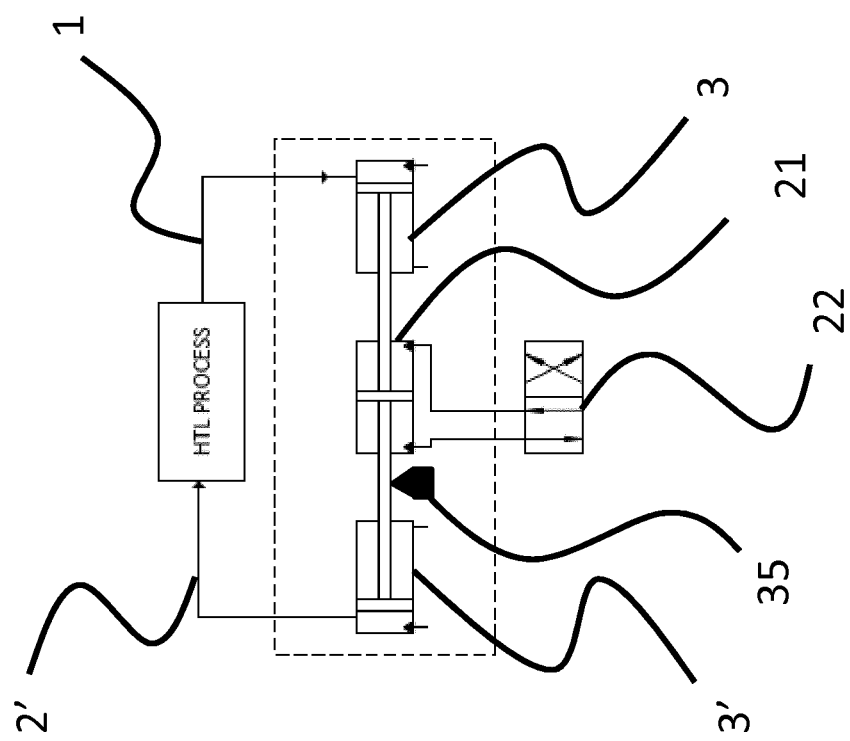
FIG. 4 shows a schematic overview of a double action pressure reduction/pressurizing system according to the invention.

From FIG. 4 a combined unit is shown where the high pressure inlet pump and the pressure reduction pump are connected. Only a single unit 3,3' is shown however typically two or more units are present. The reason for providing are for example that a certain redundancy is needed for allowing repair or maintenance on a single unit without interrupting the process operation and further the presence of two or more pump units will reduce pressure fluctuations and hence provide for less pressure caused stress in the system. The slower the system is operating, i.e. the lower the number of strokes per minute of the pumps, the less the size of the pressure fluctuations will be. Any need for supplying additional pressure will take place through control valve 22 to the servo cylinder 21.

Figure 5:
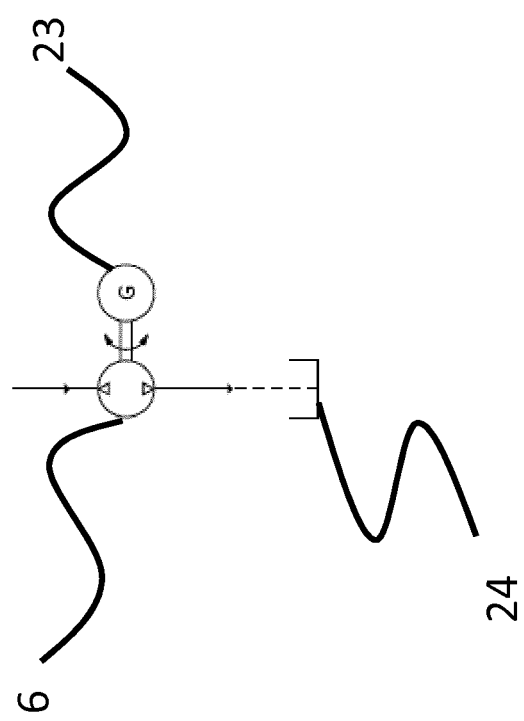
FIG. 5 shows schematically a coupling of an energy reservoir to a generator.

FIG. 5 schematically shows the coupling of an energy reservoir 6 to a generator 23. A low pressure turbine will typically be the driving means for the generator; however for the sake of simplicity this has not been depicted.

Figure 6:
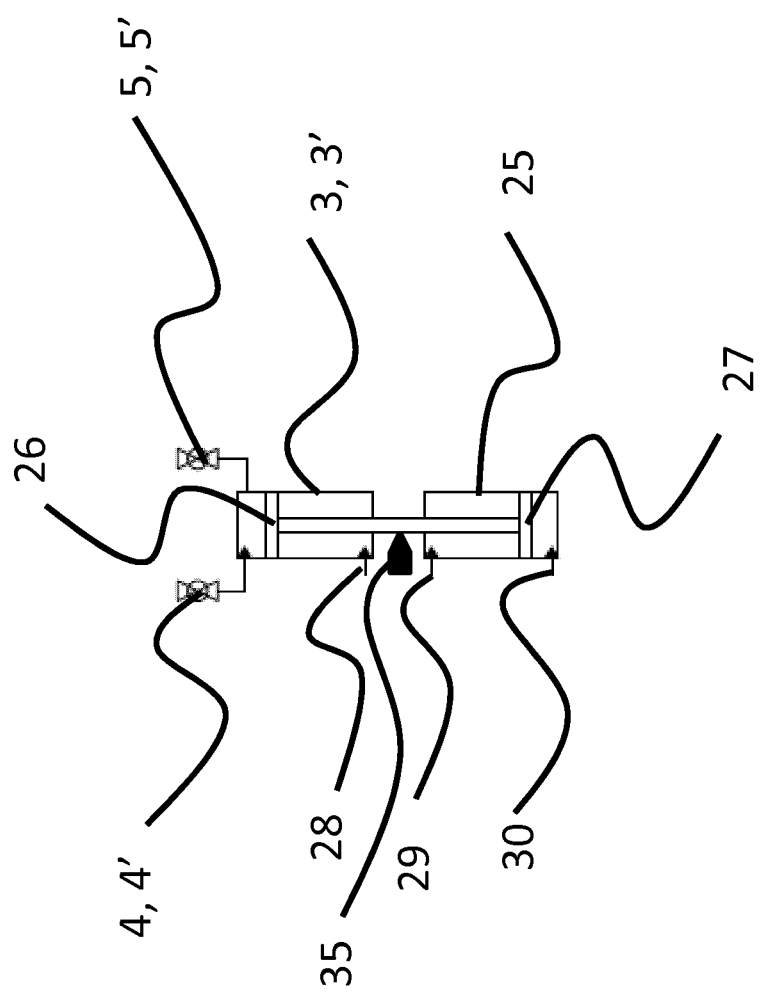
FIG. 6 shows schematically a single pressure reduction device/pressuring device.

FIG. 6 schematically shows a cylinder-piston 3,3',26 arrangement capable of acting as a pressure reduction device or as a pressurization device. The inlet and outlet valves 4,4',5,5' appear in connection with the pressure reduction/pressurization cylinder 3,3' and further the control cylinder 25 for providing a hydraulic control of the movement of the piston 26 is shown. The control cylinder comprises a piston 27 and control pressure fluid inlets/outlets 29,30. An additional inlet/outlet is shown in connection with main cylinder 3,3'.

Figure 7:
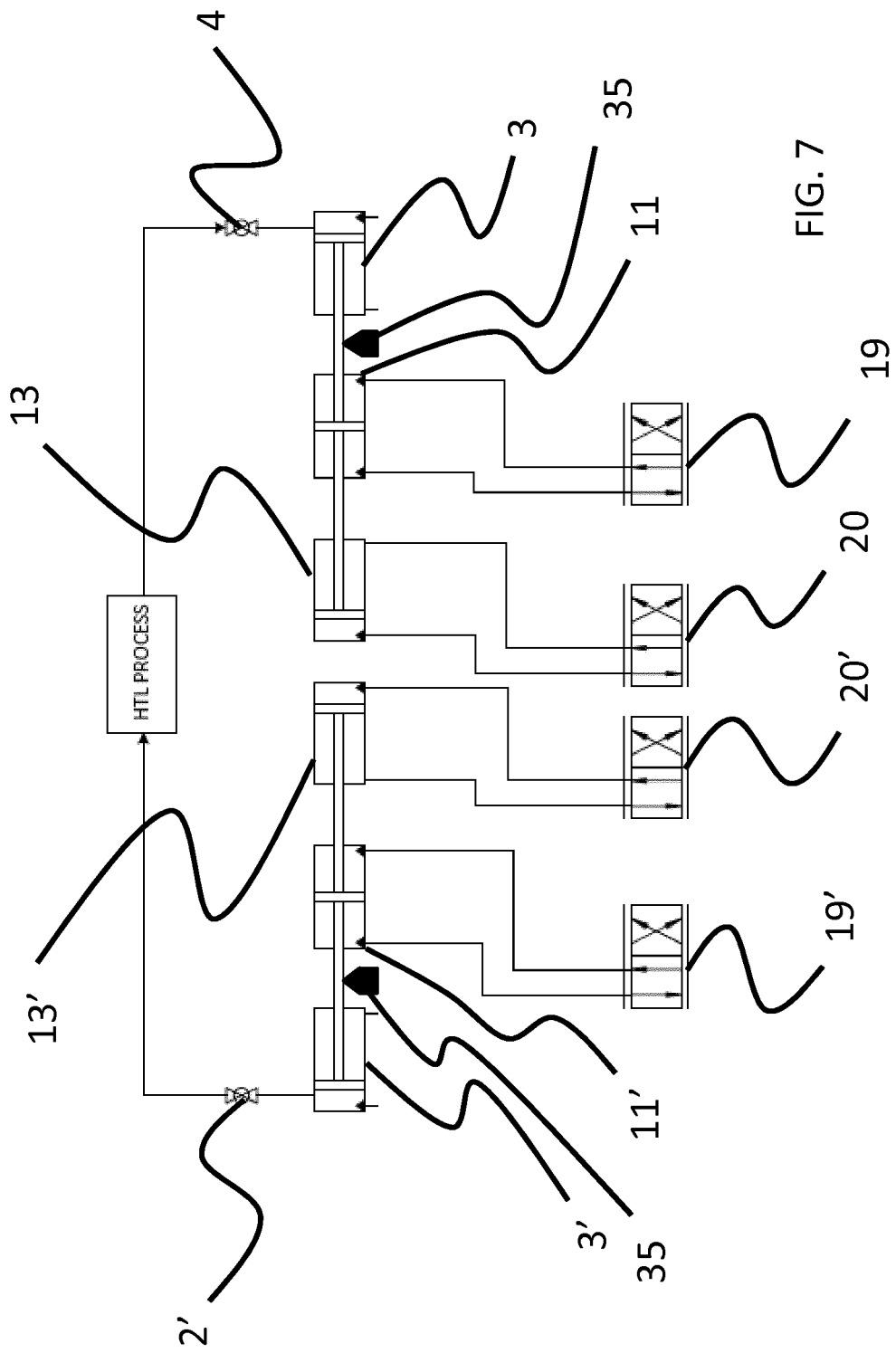
FIG. 7 shows schematically a double action pressurization system and a double action pressure reduction system.

From FIG. 7 a system appears where in connection with the HTL (hydrothermal liquefaction) process a pressurization unit 3',11',13',19',20',2' as well as a pressure reduction device 3,4,11,13,19,20 has been introduced. The pressurization and the pressure reduction devices are double acting devices where in connection with the pressure reduction device the additional cylinder-piston arrangement serves the purpose of recovering energy from the pressure reduction process and where the additional cylinder piston arrangement in connection with the pressurization device serves the purpose of utilizing the recovered energy from the pressure reduction process. Additional pressure may be applied to the pressurization device due to loss in the system.

Figure 8:
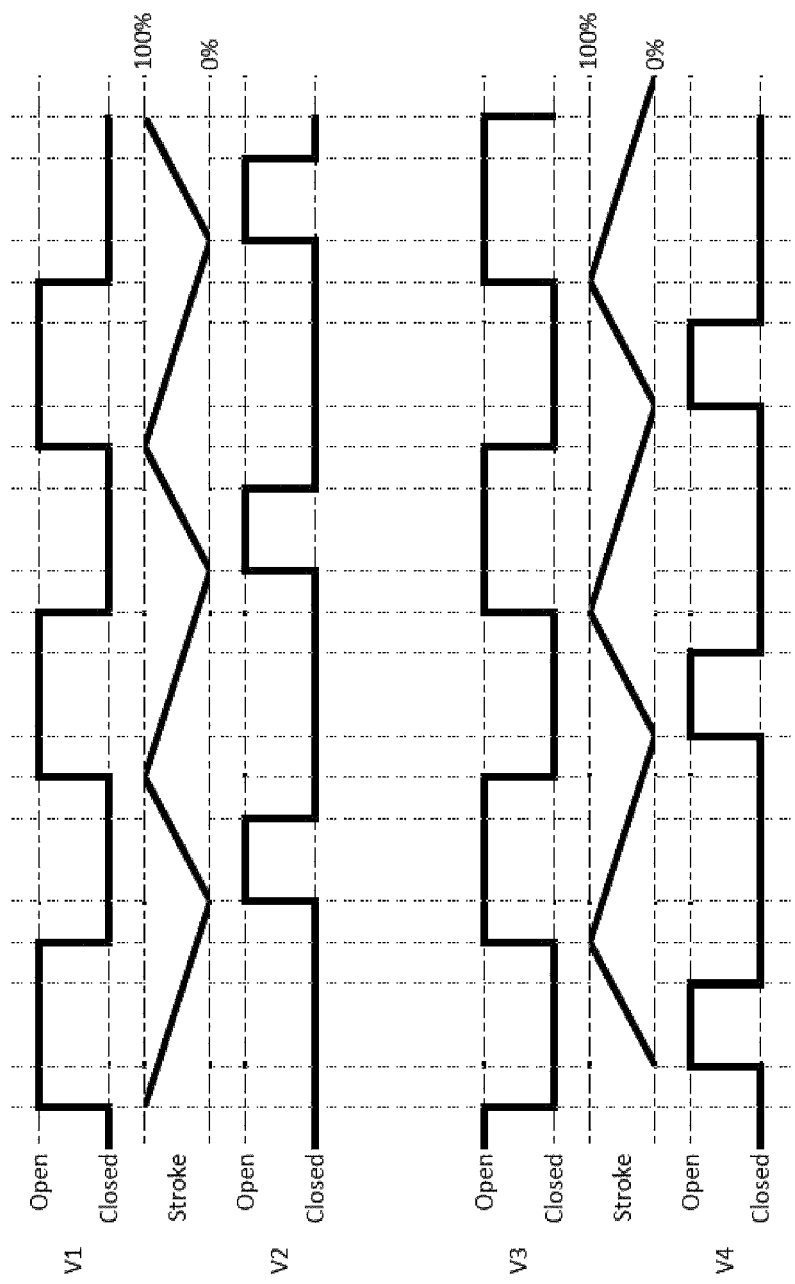
FIG. 8 shows schematically the opening and closing of inlet and outlet valves during a cycle of a pressure reduction pump.

From FIG. 8 shows the opening and closing of inlet and outlet valves of a pressure reduction device in a view where the stroke of a piston in a cylinder is depicted as well. Three cycles are depicted for two parallel pressure reduction units. It appears that the cylinder is filled as the piston moves downwards and the valve V1 is open. Valve V1 closes shortly before the piston reaches the bottom position. As the piston moves further towards the bottom position the pressure is reduced. As the piston moves upwards the valve V2 is opened and the fluid in the cylinder volume is forced out of the cylinder through let outlet. Shortly before reaching the top position for the piston the valve V2 closes and the remaining fluid in the cylinder is pressurized to the pressure existing on the process side of valve V1. When the piston reaches its top position the pressure difference between the cylinder and the process area are essentially identical and the valve V1 can open for an additional cycle.

Same procedure is shown for an additional pressure reduction device operating simultaneous with the one described above. Valves V3 and V4 carries out the same tasks as described above, however the entire cycle is displaced corresponding to a half cycle in order to minimise pressure fluctuations in the system.

Figure 9:
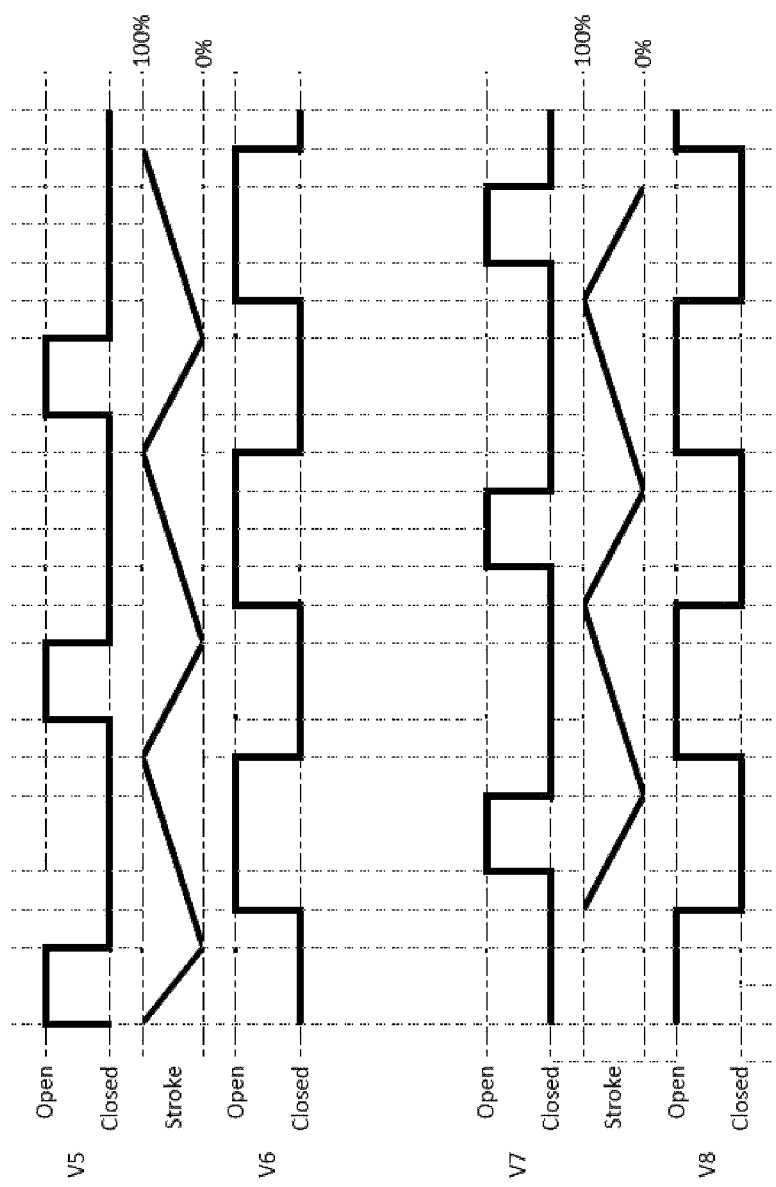
FIG. 9 shows schematically the opening and closing of inlet and outlet valves during a cycle of a pressurization pump.

FIG. 9 shows the opening and closing of inlet and outlet valves of a pressurization device in a view where the stroke of a piston in a cylinder is depicted as well. Three cycles are depicted for two parallel pressurization units. It appears that the cylinder is filled with slurry as the piston moves downwards and the valve V5 is open. Valve V5 closes shortly before the piston reaches the bottom position. As the piston moves upwards the slurry is pressurized and when valve V6 is opened and the fluid in the cylinder volume is forced out of the cylinder through the outlet and into the HTL process. Shortly before reaching the top position for the piston the valve V6 closes and the remaining fluid in the cylinder is de-pressurized to the pressure existing on the process side of valve V5. When the piston has moved slightly from its top position the pressure difference between the cylinder and upstream area are essentially identical and the valve V5 can open for an additional cycle.

Same procedure is shown for an additional pressure reduction device operating simultaneous with the one described above. Valves V7 and V8 carries out the same tasks as described above, however the entire cycle is displaced corresponding to a half cycle in order to minimise pressure fluctuations in the system.

Figure 10:
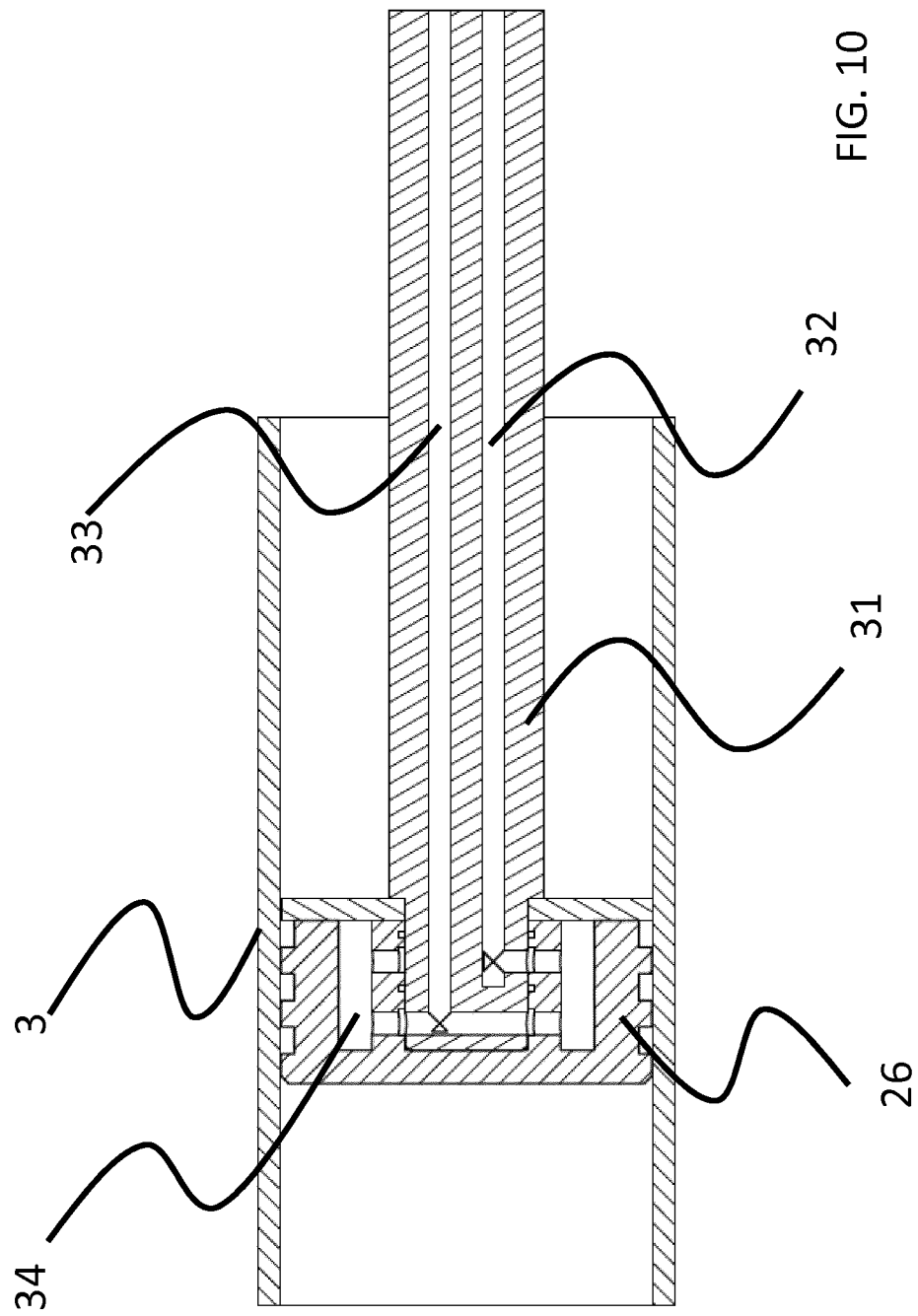
FIG. 10 shows a schematic overview of a pump piston with cooling.

FIG. 10 shows a cylinder-piston arrangement 3,26, where in a piston rod 31 conduits or channels 32,33 for supplying and removing a cooling fluid are provided. The cooling fluid is supplied to the piston 26 through channel 32 and flowing inside the piston in a ring channel 34 before being removed through channel 33. This may be a measure that ensures higher reliability at high temperature and high pressure.

Figure 11:
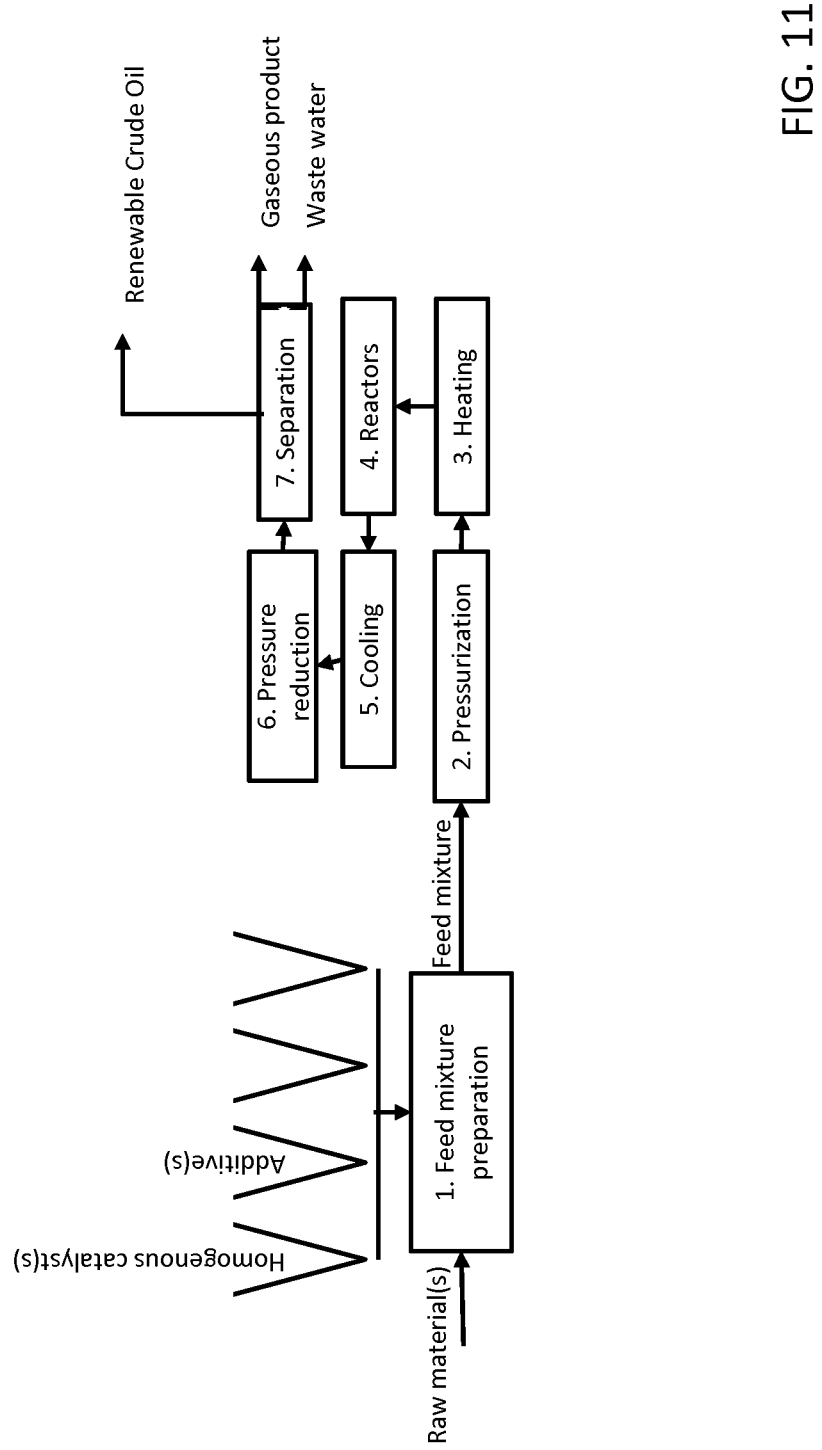
FIG. 11 shows a schematic overview of an embodiment of the present invention for continuous high pressure process for conversion of carbonaceous materials such as biomass to renewable oil.
Figure 12:
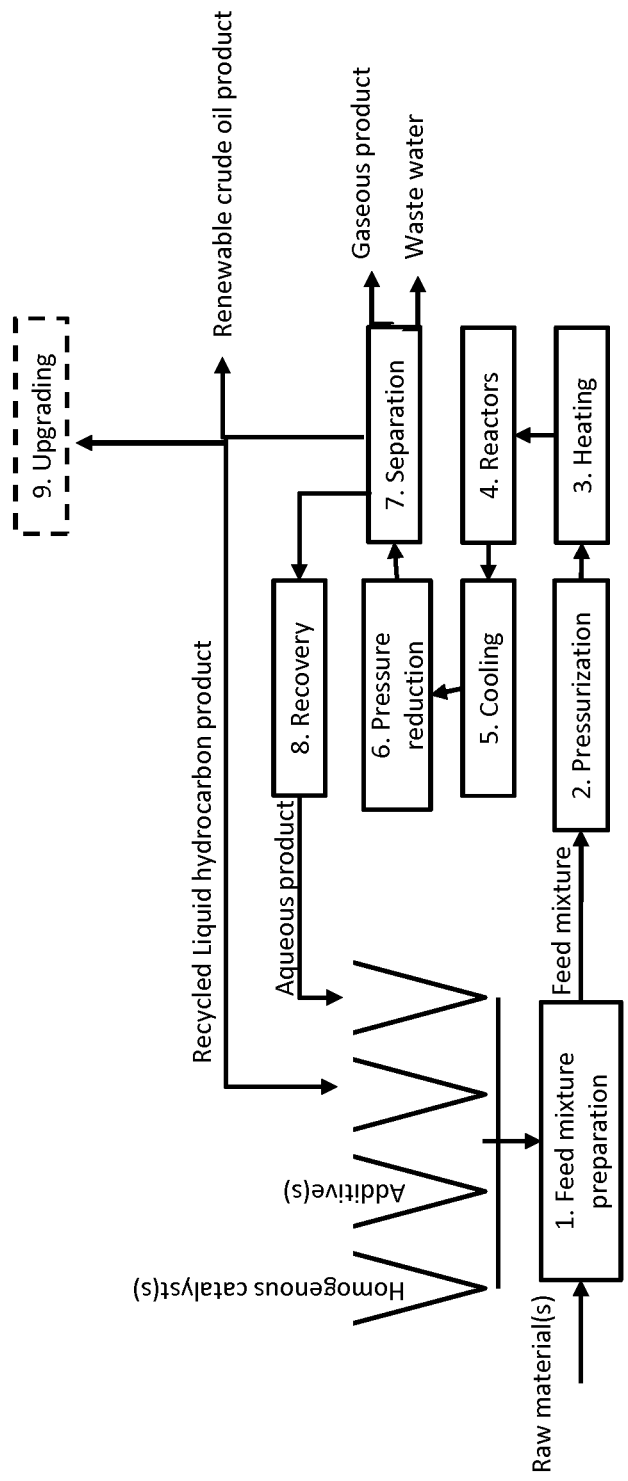
FIG. 12 shows an advantageous embodiment of a continuous high pressure process for hydrothermal transformation of carbonaceous materials such as biomass in to renewable fuels according to the present invention.

FIG. 11 and FIG. 12 shows HTL processes that are further explained in the following.

Pressure Reduction Unit:

The pressure reduction unit can consist of two or more piston pumps, that can be controlled in a way that use any number of pumps however preferably at least two pumps. A piston pump comprises a cylinder with a piston and valves for inlet and outlet as well as driving means for applying a force or receiving a force to/from the piston.

The pumps are designed as a hydraulic pressure amplifier with a ratio that meets operating conditions. The amplification is achieved through the dimensioning of the pressurized surface area of the pistons. In negative amplification (an attenuation or damping) may be achieved through an opposite variation of the pressurized surface areas.

Pumps are designed in a way that allows cleaning of the pump interior. Reducing dead space at maximum stroke ensures this.

By minimizing obstructions such as valves and guide channels non-active volume on top of piston at maximum piston stroke is eliminated. Too much dead space at full stroke leaves more residual feed material in cylinder.

When not having dead volume at maximum piston stroke there is limited space for residual biomass, which makes cleaning much easier since almost no feed material is left behind after each stroke.

Another advantage by reducing dead space is to prevent build-up of unprocessed feed material inside the pump unit.

Pump Control:

In order to determine the piston position in a cylinder, positioners are built in to the piston rod, so that the piston position is known at any given moment. This helps controlling pressure and flow in cylinder.

Pressure is measured by built in pressure transmitters. Pressure transmitters are built in to top of each cylinder so pump conditions are always monitored. If pressure transmitters are not built in to the cylinder top and built into the following tubing after control valves, it is impossible to ensure 0 bar Δp over control valves.

Minimum Δp over control valves ensure minimum wear from possible abrasives in feed as well as minimum mechanical wear else caused by high physical pressure towards valve seats.

Installing position sensors in cylinder piston rods makes it possible to measure flow through cylinder by aid of mathematical functions that takes piston frequency, piston area and length of piston stroke in to account. Being able to manage piston position reduces pressure pulsations as control valves and piston position can be controlled very accurately making it possible to pressurize remaining content in cylinder in order to eliminate Δp over control valves and therefore also no pressure drop when opening control valves.

Δp Valves:

Control of cylinders by use of positioner so Δp across inlet/outlet valves is reduced as much as possible in order to reduce wear of valve seats. Δp is reduced as much as possible by monitoring pressure on both sides of the control valves by pressure transmitters while either compressing or decompressing media in cylinder to meet common pressure setting. Position sensors are used in the control loop for timing the control valves, in a way that ensures enough feed material in cylinder to compress to process pressure in filling mode and leave enough piston stroke to ensure decompression before emptying the cylinder Pressure De-amplifier:

Hydraulic energy can be recovered at different pressures when using hydraulic pressure de-amplifiers. The energy absorbed as a result of the pressure reduction may be stored as pressurised fluid or may be utilised directly for driving e.g. an electrical generator.

Flow Measurement:

By use of incorporated positioners the piston position may be determined and hence a measure for the processed flow through the pressure reduction unit.

Inlet/outlet Valves:

Valves used for controlling inlet and outlet of pressure reduction unit are typically of a controlled ball valve type. An actuator is used to control the movement of the valves.

Filling/emptying of Pressure Reduction Unit:

During filling first pressure reduction unit, counter pressure is held in the hydraulic cylinder during entire stroke to maintain a constant pressure in the pressure reduction unit.

Before first pressure reduction unit has reached the end of its stroke a second pressure reduction unit has prepared by compressing remaining fluid to operating pressure before opening inlet valve and taking over from first pressure reduction unit.

First pressure reduction unit can now decompress contents by expanding cylinder to the end of stroke and empty cylinder content by means of the hydraulic cylinder leaving enough in pressure reduction unit to compress media to operating pressure.

Maintenance:

Main pressure reduction arrangement comprising a number of pressure reduction units, is constructed in a way that allows replacement of a pressure reduction unit segment during operation. Means for safe separation of a pressure reduction unit segment is a total separation from the operation of the unit in question through appropriate valve arrangements. Further the remaining units may be reconfigured during a maintenance operation to be distributed over the working cycle of the pressure reduction arrangement in order to avoid pressure fluctuations.

Seals:

When necessary, hydraulic seals are cooled in order to withstand operating conditions.

Function of Pressure Let Down/reverse Pump

Reverse pump cylinder 1 is filled through V1 until cylinder has reached a given stroke that allows media to decompress by moving cylinder piston further towards end of stroke. Before moving piston to end of stroke, V1 closes.

After decompression V2 opens and the hydraulic cylinder presses the decompressed fluid out of the cylinder to phase separation. Cylinder 1 does not empty completely as it is necessary to withhold enough fluid to pressurize to process pressure by compression with V2 closed.

The reason is to avoid pressure drop across V1, when it is time to reopen for next filling.

Similarly when V1 closes V3 opens. Before V3 can open, the remaining fluid from the latter stroke is pressurized to prevent excessive wear of valve seats by avoiding high pressure drop.

FIG. 10 shows an embodiment of a continuous high pressure production process for conversion of carbonaceous materials such as biomass to renewable oil comprising pumping means and pressurization means according to the present invention.

As shown on FIG. 10, the carbonaceous material is first subjected to a feed mixture preparation step. The feed mixture preparation step transforms the carbonaceous material into a pumpable feed mixture and generally includes means for size reduction of the carbonaceous and slurrying the carbonaceous material with other ingredients such as water, catalysts and other additives such as organics in the feed mixture.

The second step is a pressurization step where the feed mixture is pressurized by pumping means to a pressure of at least 150 bar and up to about 400 bar.

An advantageous pumping means according to an embodiment of the present invention are where the pressurization unit comprises at least one inlet and an outlet, the pressurization unit being adapted to receive a feed fluid at a feed pressure level at the inlet, being adapted to isolate the received feed fluid from the inlet and from the outlet and being adapted to increase the pressure of the fluid to a higher predetermined level and further being adapted to output the fluid through the outlet into the high pressure process while still isolated towards the inlet.

The pressurization unit preferably comprises an actuated valve at the inlet and a actuated valve at the outlet and further a pressurization device between the inlet valve and the outlet valve. This is preferably achieved by a pressurization device comprising a pump unit having a cylinder and a piston as well as means for driving the piston inside the cylinder.

Preferably means are provided for measuring the pressure upstream the inlet valve, between the inlet valve and the outlet valve and downstream the outlet valve.

In one embodiment a position indicator is provided indicating the cycle position of the pressure reduction device and being adapted to provide a control signal for opening or closing at least one valve in the pressure reduction system.

In an embodiment the pressure reduction unit comprises a pressure reduction device comprising a cylinder and a piston as well as means for driving the piston inside the cylinder.

In a further embodiment the pressure reduction unit may further comprise a control system, where the control system is adapted to allow opening of the valves when a certain maximum pressure difference is present on either side of the valve to be opened.

The pressurized feed mixture is subsequently heated to a reaction temperature in the range from about 300 and up to about 450° C.

The feed mixture is generally maintained at these conditions in sufficient time for conversion of the carbonaceous material e.g. for a period of 2 to 30 minutes, such as in the range 3 to 20 minutes; and preferably in the range 5 to 15 minutes, before it is cooled and the pressure is reduced.

The product mixture comprising liquid hydrocarbon product, water with water soluble organics and dissolved salts, gas comprising carbon dioxide, hydrogen, and methane as well as suspended particles from said converted carbonaceous material is subsequently cooled to a temperature in the range 80° C. to 250° C. such as in the range 120 to 170° C.;

The cooled product mixture thereafter enters a pressure reducing device according to the present invention, where the pressure reduction unit comprises at least one inlet and an outlet, the pressure reduction unit being adapted to receive a pressurized fluid at process pressure level at the inlet, being adapted to isolate the received pressurized fluid from the upstream process and from the outlet and being adapted to reduce the pressure of the fluid to a lower predetermined level and further being adapted to output the fluid through the outlet while still isolated towards the upstream process.

In general Pressure reduction unit comprises an actuated valve at the inlet and an actuated valve at the outlet and between the inlet valve and the outlet valve a pressurization device. Further a pressure reduction unit according to an embodiment of the present invention comprises means for measuring the pressure upstream the inlet valve, between the inlet valve and the outlet valve and downstream the outlet valve.

The pressure reduction unit according to the present invention may further comprise a pump unit having a cylinder and a piston as well as means for driving the piston inside the cylinder. Advantageously the pressure reduction unit further comprises a position indicator indicating the cycle position of the pressure reduction device and being adapted to provide a control signal for opening or closing at least one valve in the pressure reduction system.

In one embodiment the pressure reduction unit further comprises a control system, where the control system is adapted to allow opening of the valves when a certain maximum pressure difference is present on either side of the valve to be opened.

Often the pressure reduction system is operated so that the inlet valve after having allowed inflow of a feed stream is closed for a period before the outlet valve is opened, hereby allowing the pressure to be reduced in pressure reduction device.

In order to minimize the pressure loss over the inlet valve and thereby the wear, the outlet valve may be closed for a period before the inlet valve is opened, hereby allowing pressure to be generated in the pressure reduction device in a predefined way. The overlap of closed inlet and outlet valves corresponds to between 5 and 30% of the working cycle, preferably between 10 and 20% of the working cycle.

A pressure reduction arrangement according to the present invention, typically comprises two or more pressure reduction units being arranged in parallel and/or in series. The working cycles of the individual pressure reduction units of the pressure reduction arrangement be evenly distributed corresponding to the number of pressure reduction units.

Further the pressure reduction arrangement may include a position indicator each pressure reduction device, indicating the cycle position in the device and being adapted to provide a control signal for controlling the distribution of the pressure reduction unit cycles.

In general, the pressure in the high pressure processing system is reduced comprising entering a volume of pressurized fluid into a pressure reduction device closing the entry of pressurized fluid and expanding the entered volume to a desired pressure level by increasing the pressure reduction device volume, removing the fluid at the desired pressure level from the pressure reduction device by reducing the pressure reduction device volume.

The speed of the pump is in many applications of the present invention in the in the range 5-50 cycles per minute, preferably 5-25, most preferred 5-15 cycles per minute.

An advantageous embodiment of a pressure reduction device according to the present invention is where the pressure reduction pump is connected to a further pump that drives a pressurization of the energy absorption reservoir. For example the pressure reduction device further comprising an energy reservoir, where the pump is operatively connected to the reservoir and where the energy absorbed by the pump is converted and transferred to the reservoir for successive utilization. In a preferred embodiment a a pressurization pump is provided for supplying additional pressure to the input side of the pressurization equipment in order to compensate for loss of pressure energy in the system.

In a preferred embodiment, the energy reservoir drives a pressurization pump adapted to pressurize the feed mixture in the pressurization step (step 2 above) of the high pressure process. In one embodiment of the present invention, this is performed by a low pressure turbine connected to a generator generating electrical energy, and the electricity generated reduces the energy required to drive the pressurization pump in the pressurization step.

The converted feed mixture is further separated into at least a gas phase, a renewable crude oil phase, a water phase with water soluble organic compounds as well as dissolved salts and eventually suspended particles. The separation may be performed by gravimetric phase separation or other suitable means such as centrifugation.

The renewable crude oil may further be subjected to upgrading the process where it is pressurized to a pressure in the range from about 20 bar to about 200 bars such as a pressure in the range 50 to 120 bar, before being heated to a temperature in the range 300 to 400° C. in one or more steps and contacted with hydrogen and heterogeneous catalyst(s) contained in one or more reaction zones, and eventually fractionated into different boiling point fractions.

FIG. 12 shows an advantageous embodiment of a high pressure process for hydrothermal transformation of carbonaceous material such as biomass in to renewable transportation fuels, lubricants and/or fine chemicals comprising pressurization and a pressure let down system according to the present invention.

1. Preparation of Feed Mixture

The first step of the process is to prepare a feed mixture in the form of a pumpable slurry of the carbonaceous material. This generally includes means for size reduction and slurrying such as dispersing the organic matter with other ingredients such as water, catalysts and other additives such as organics in the feed mixture, A carbonaceous material according to the present invention may be in a solid form or may have a solid appearance, but may also be in the form of a sludge or a liquid. Further the carbonaceous material(-s) may be contained in one or more input streams.

Non limiting examples of carbonaceous feedstock according to the present invention include biomass such as woody biomass and residues such as wood chips, saw dust, forestry thinnings, road cuttings, bark, branches, garden and park wastes & weeds, energy crops like coppice, willow, miscanthus, and giant reed; agricultural and byproducts such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like miscanthus, switch grass, sorghum, jatropha; aquatic biomass such as macroalgae, microalgae, cyano bacteria; animal beddings and manures such as the fibre fraction from livestock production; municipal and industrial waste streams such as black liquor, paper sludges, off spec fibres from paper production; residues and byproducts from food production such as juice or wine production; vegetable oil production, sorted municipal solid waste, source sorted house wastes, restaurant wastes, slaughter house waste, sewage sludge and combinations thereof.

Many carbonaceous materials according to the present invention are related to lignocellulose materials such as woody biomass and agricultural residues. Such carbonaceous materials generally comprise lignin, cellulose and hemicellulose.

An embodiment of the present invention includes a carbonaceous material having a lignin content in the range 1.0 to 60 wt % such as lignin content in the range 10 to 55% wt %. Preferably the lignin content of the carbonaceous material is in the range 15 to 40 wt % such as 20-40 wt %.

The cellulose content of the carbonaceous material is preferably in the range 10 to 60 wt % such as cellulose content in the range 15 to 45% wt %. Preferably the cellulose content of the carbonaceous material is in the range 20 to 40 wt % such as 30-40 wt %.

The hemicellulose content of the carbonaceous material is preferably in the range 10 to 60 wt % such as cellulose content in the range 15 to 45% wt %. Preferably the cellulose content of the carbonaceous material is in the range 20 to 40 wt % such as 30-40 wt %.

Depending on the specific organic matter being transformed and how it is received, the size reduction may be conducted in one or more steps e.g. the carbonaceous material may be treated as is and subsequently mixed with other ingredients in the same step or it may pre-grinded to a size suitable for further processing and size reduction in the mixing step. Often the carbonaceous material is size reduced to a particle size less than 10 mm such as a particle size of less than 5 mm the pre-grinding step; preferably to a particle size of less than 3 mm such as less than 2 mm.

The pre-grinding may according to an embodiment of the present invention be performed using a shredder, cutting mill, hammer mill, pan grinder, impeller mill or a combination thereof.

Advantageously the pre-grinding step may further comprise means for removal of impurities such as metals, stones, dirt like sand, and/or to separate off spec fibres from the carbonaceous material with particle size with said maximum size. Such means may comprise magnetic separation, washing, density separation such as flotation, vibration tables, acoustic separators, sieving and combinations thereof. Said means may be present prior to the pre-grinding step and/or after the pre-grinding step.

The carbonaceous material is subsequently mixed with other ingredients of the feed mixture. Other ingredients may include:

1. Recycled oil (hydrocarbons) produced by the process or a fraction of the oil (hydrocarbon produced by the process; preferably in a weight ratio to dry ash free organic matter in the range 0.5 to 1.5 such as a ratio 0.8 to 1.2;
2. Recycled concentrate of the water phase from the process comprising recovered homogeneous catalyst and water soluble organics such as one or more components selected from a. Ketones such as acetone, propanones, butanones, penthanones, penthenones, cyclopentanones such as 2,5 dimethyl cyclopentanone, cyclopentenones, hexanones and cyclohexanones such as 3-methyl hexanone, quionones etc.

b. Alcohols and poly alcohols such as methanol. ethanol, propane's (incl isopropanol), buthanols, penthanols, hexanols, heptanols, octanols such as 2-butyl-1-octanol, hydroquinones etc c. Phenols, alkylated phenols, poly-phenols, monomeric and oligomeric phenols, creosol, thymol, alkoxy phenols, p-coumaryl alcohol, coniferyl alcohol, sinapyl alcohol, flavenols, catechols d. Carboxylic acids such as formic acid, acetic acid and phenolic acids like ferric acid, benzoic acids, coumarin acid, cinnamic acid, abietic acid, oleic acid, linoleic acid, palmetic acid, steric acid e. Furans such as THF etc f. Alkanes, alkenes, toluene, cumene etc.

and combinations thereof.

In general the water soluble organics constitute a complex mixture of the above and the feed mixture may comprise such water soluble organics in a concentration from about 1% by weight to about 10% by weight such as in the range from about 2% by weight to about 5% by weight.

3. Make up homogeneous catalyst in form a potassium carbonate and/or potassium hydroxide and/or potassium acetate; preferably added in the form of an aqueous solution and added in an amount so that the total concentration of potassium in the resulting feed mixture is at least 0.5% by weight such as a concentration in the feed mixture of at least 1.0% by weight; preferably the concentration of potassium is at least 1.5% by weight such as at least 2.0% by weight;

4. Make up base for pH adjustment. Preferably sodium hydroxide is added to the feed mixture in an amount so as the pH measured in the recycled water phase is above 7 and preferably in the range 8.0 to 12.0 such as in the range 8.0 to 10.0.

The ingredients 1.-4. are preferably all on a liquid form and may advantageously be premixed and optionally preheated, before being mixed with the organic matter to produce said feed mixture. Premixing and/or preheating may reduce loading time and heating time required in the mixer.

The mixing of the carbonaceous material and other ingredients are mixed so as to form a homogeneous slurry or paste. Said mixer may according to the present invention be a stirred vessel equipped with means for efficiently mixing, dispersing and homogenizing viscous materials such as a planetary mixer, Kneader or Banbury mixer. The mixer is preferably further equipped with means for heating said feed mixture to a temperature in the range 80 to 220° C., preferably in the range 130 to 200° C. and more preferably in the range 150 to 180° C., at sufficient pressure to avoid boiling such as a pressure in the range 1-30 bars, preferably in the range 4-20 bars such as in the range 5-10 bars. Heating the feed mixture to temperatures in the above ranges results in a softening and/or at least partly dissolution of the carbonaceous thereby making the feed mixture easier to size reduce and homogenize. Preferred means for heating said feed mixture during the preparation according to the present invention include a heating jacket. In a preferred embodiment the heat for preheating said feed mixture is obtained from the cooling of the converted carbonaceous material comprising liquid hydrocarbon product e.g. by heat exchange with this process stream. Hereby the energy efficiency of the process may be further enhanced. The mixer may further be equipped with a re-circulation loop, where material is withdrawn from said mixer and at least partly re-circulated in an internal or external loop and re-introduced into said mixer so as to control the feed mixture characteristics e.g. rheological properties such as viscosity and/or particle size to a predefined level. The external loop may further comprise one or more size reduction and/or homogenization device(-s) such as a macerator and/or a colloidal mill and/or a cone mill or a combination thereof in a series and/or parallel arrangement. The feed mixture produced may be fed to a holding tank before entering the pressurization step of the process. Preferably, the carbonaceous material is fed to the mixer gradually rather than at once to control the viscosity of the feed mixture and that feed mixture remains pumpable, while being size reduced and homogenized. The control of the viscosity may be performed by measuring the power consumption of the mixer and/or colloidal mill and adding organic matter to the feed mixture according to a predefined power consumption. It is further advantageous not to empty the mixer completely between batches as the prepared feed mixture acts as a texturing agent for the next batch and thereby assists in homogenizing the next batch by making it more pumpable, and thereby the carbonaceous material may be added faster.

Other preferred means for thoroughly mixing and homogenizing the ingredients in the feed mixture include inline mixers. Such inline mixers may further introduce a cutting and/or a scissoring and/or a self-cleaning action. A preferred embodiment on such inline device include one or more extruders.

Typically the dry content of carbonaceous material in the feed mixture according to the present invention is in the range 10 to 40% by weight, preferably in the range 15 to 35% and more preferably in the range 20 to 35% by weight.

The process according to the present invention requires water to be present in said feed mixture. Typically the water content in said feed mixture is at least 30% by weight and in the range 30 to 80% by weight and preferably in the range 40 to 60%.

2. Pressurization

The second step of an advantageous embodiment of a high pressure process according to the present invention is pressurization to the desired pressure for said conversion process. According to the present invention said pressurization to the desired reaction pressure is essentially performed before heating from entry temperature from the feed mixture to the reaction temperature is initiated.

Typicaly the feed mixture is pressurized to an operating pressure during said heating and conversion of at least 150 bars such as 180 bars, preferably said operating pressure is at least 221 bars such as at least 250 bars and more preferably said operating pressure during conversion is at least 300 bars. Even more preferably the operating pressure is in the range of 300-400 bars such as in the range 300-350 bars.

Many embodiments according to the present invention relates to processing of feed mixtures with a high content of carbonaceous material as described above. Such feed mixtures typically have densities in the range 1050 to 1200 kg/m3, and typically behaves as a homogeneous pseudoplastic paste rather than a suspension of discrete particles (liquid). The viscosity of such pastes may vary widely with shear rate due to the pseudoplastic (shear thinning) behavior and may be in the $10^3$ to $10^7$ cP depending of the specific shear rate and carbonaceous material being treated.

An aspect of the present invention relates to a pressurization system for pressurizing such highly viscous pseudoplastic feed mixtures. According to a preferred embodiment of the present invention, the pressurization system comprises two or more pressure amplifiers each comprising cylinders with a piston equipped with driving means for applying and/or receiving a force to the piston such as shown and described in connection with FIG. 2-9. Advantageous driving means for the pistons in the cylinders according to the present invention include hydraulically driven means.

The surface area of the pistons according to the present invention is typically dimensioned so as to amplify the pressure i.e. the surface area of each end of the piston is dimensioned so as to obtain a predefined pressure ratio on each side of the piston. The ratio of surface area on the low pressure side of the piston to the surface area on the high pressure side of the piston may according to an embodiment of the present invention be in the range 1 to 20 such as in the range 1 to 10. Preferably the ratio of surface area on the low pressure side of the piston to the surface area on the high pressure side of the piston is in the range 1 to 3 such as in the range 1 to 2.

The pressure amplifiers according to the present invention are typically designed for low stroke speeds (large stroke volume) thereby allowing for the use of actuated valves for filling and emptying of the cylinders rather than check valves. Preferred actuated valves according to the present invention include gate valves and ball valves or a combination thereof.

The stroke speed of the pistons according to an embodiment of the present invention may be from about 1 stroke per minute up to about 150 strokes per minute such as from about 5 strokes per minute up to about 100 strokes per minute. Preferably the stroke speed of the pistons are from about 10 to about 80 strokes per minute such as a stroke speed of the piston in the range 20 strokes per minute to about 60 strokes per minute. Besides allowing for the use of actuated valves the low stroke speed of the piston reduces the wear on pistons, seals and valve seats.

Often the pressure amplifiers according to the present invention are further designed as double acting pistons as shown in FIG. 1.

The pressure amplifiers according to an embodiment of the present invention are further designed so as to maximize the cleaning effect of the piston by minimization of the dead space in the cylinder. Pumps are designed in a way that allows cleaning of the pump interior. Reducing dead space at maximum stroke ensures this. The may be performed by minimizing obstructions such as valves and guide channels and thereby non-active volume on top of piston at maximum piston stroke is eliminated. Too much dead space at full stroke leaves more residual feed material in cylinder. When not having dead volume at maximum piston stroke there is limited space for residual biomass, which makes cleaning much easier since almost no feed material is left behind after each stroke. Another advantage by reducing dead space is to prevent build-up of unprocessed feed material inside the pump unit.

Still further the pressure amplifiers may be equipped with positioners to monitor and control the position of the piston at any given moment. The piston positioners are preferably incorporated into the cylinder rod. The positioners are used to control the position of the piston. The positioners of the pressure cylinders may also be used to extract a flow measurement of media being pressurized by the both individual cylinder and the pressurization system i.e. the volumetric flow rate of the individual cylinder is given by the stroke volume multiplied by the number of strokes over a given time interval, and the same total volumetric flow rate may be extracted as the sum of the volumetric flow measurements of the individual cylinders.

The positioner(-s) according to the present invention may further be used for synchronization of the strokes of the individual pressure amplifiers e.g. when the feed in a cylinder is being pressurized, another cylinder(s) is being charged with feed mixture. After the cylinder has been charged, the cylinder is pre-pressurized to a pre-defined level by initiating the stroke with the valve towards the process closed. When the first cylinder has reached a certain stroke length, the actuated valve towards the process is closed and the equivalent valve towards the process for the next cylinder with pre-charged and pre-pressurized feed mixture to be pressurized is opened. By applying such sequence according to an embodiment of the present invention the pressure drop over the actuated valve towards the process and consequentially valve wear and pressure fluctuations are minimized.

In order to determine the piston position in a cylinder, positioners are built in to the piston rod, so that the piston position is known at any given moment. This helps controlling pressure and flow in cylinder.

Pressure is measured by built in pressure transmitters. Pressure transmitters are built in to top of each cylinder so pump conditions are always monitored. If pressure transmitters are not built in to the cylinder top it and only built into the following tubing before and after control valves it is impossible to ensure 0 bar $\Delta p$ over control valves.

Minimum $\Delta p$ over control valves ensure minimum wear from possible abrasives in feed as well as minimum mechanical wear else caused by high physical pressure towards valve seats.

Installing position sensors in cylinder piston rods makes it possible to measure flow through cylinder by aid of mathematical functions that takes piston frequency, piston area and length of piston stroke in to account. Being able to manage piston position reduces pressure pulsations as control valves and piston position can be controlled very accurately making it possible to pressurize remaining content in cylinder in order to eliminate $\Delta p$ over control valves and therefore also no pressure drop when opening control valves.

Control cylinders by use of positioner so Ep across inlet/outlet valves is reduced as much as possible in order to reduce wear of valve seats. $\Delta p$ is reduced as much as possible by monitoring pressure on both sides of the control valves by pressure transmitters while either compressing or decompressing media in cylinder to meet common pressure setting. Position sensors are used in the control loop for timing the control valves, in a way that ensures enough feed material in cylinder to compress to process pressure in filling mode and leave enough piston stroke to ensure decompression before emptying the cylinder.

The pressure fluctuations may be further reduced by the use of at least 2 and preferably 3 or more pressure amplifiers in a parallel arrangement according to a preferred embodiment of the present invention. The control of the individual pressure amplifiers may be adapted so they are operated in a sequential manner to damp and minimize pressure fluctuation when switching from one pressure amplifier to the next.

For many embodiments of the present invention, where 3 or more cylinders are present these are equipped with sealing means such as double valves so that an individual cylinder can be sealed off and safely exchange an individual cylinder, while other cylinders are kept operating. A more robust, easy to maintain pressurization arrangement having a high availability is hereby obtained.

A pressurization arrangement according to an advantageous embodiment of the present invention includes withdrawing the feed mixture from the feed mixture preparation step 1. described above, often via a holding tank, and transferring the feed mixture to the pressurization step by a pre-charging pump. The pre-pressurization pump or the pre-charging of the pressurization step is preferably a positive displacement pump such as a piston pump progressive cavity pump, lobe pump, rotary gear pump, auger pump, or screw pump. Due to the shear thinning characteristics of the feed mixtures according to many embodiments of the present invention, the holding tank may be equipped with agitation means in order to induce shear on the feed mixture and thereby reduce the viscosity before being charged to pressure amplifying cylinders. The shear and agitation of the holding tank may also be at least partly introduced by re-circulation of part of the feed mixture being withdrawn from the holding tank by the pre-charging pump.

The inlet temperature to the pressure amplifying cylinders is generally in the range from about 10° C. to about 250° C. such as from about 20° C. to about 220° C.; preferably the inlet temperature to the pressure amplifying cylinders is in the range from about 50° C. to about 210° C. such as from about 80° C. to about 200° C.; even more preferably the inlet temperature to the pressure amplifying cylinders is in the range from about 100° C. to about 180° C. such as from about 120° C. to about 170° C.

For applications according to the present invention, where the temperature exceeds about 120° C. such as about 140° C., the cylinders may further be equipped with means for cooling the seals of piston in order to withstand the operating conditions as shown and described in connection with FIG. 9 above.

In an advantageous embodiment pressure energy is recovered in the pressure reduction step described below under step 6. Pressure reduction, and transferred to an energy absorption reservoir, where the energy absorbed by the pressure reducing device is transferred to the reservoir for successive utilization in e.g. the pressurization step. Thereby a very energy efficient high pressure process is obtained.

3. Heating

The pressurized feed mixture is subsequently heated to a reaction temperature in the range 300 to 450° C. such as in the range 350 to 430° C., preferably in the range 370 to 430° C. such as in the range 390 to 430° C., more preferred in the range 400 to 420° C. such as in the range 405 to 415° C.

According to a preferred embodiment of the present invention said heating is performed in one or more heat exchangers. Preferably said heating is at least partly performed by recovery of heat from one or more process streams.

In a preferred embodiment, the heating is performed by indirect heat exchange with a heat transfer medium such as supercritical water. By use of such heat transfer medium it is obtained that both the feed mixture and the product mixture may flow inside tubes thereby allowing for easier cleaning.

By said heat recovery it is obtained that the process becomes very energy efficient as most of the heat required is recovered. In many embodiments of the present invention at least 40% of the energy required to heat the feed mixture to the desired reaction temperature is being recovered such as at least 50% of the energy required to heat the feed mixture to the desired reaction temperature is being recovered. Preferably, at least 60% required to heat the feed mixture to the desired reaction temperature is recovered such as at least 70% of the energy required being recovered.

4. Reaction

Subsequent to heating to reaction temperature said pressurized and heated feed mixture is maintained at the desired pressure and temperature in a reaction zone c. for a predefined time. The feed characteristics and/or the combination of pressure and temperature according to the present invention generally allow for shorter reaction times and/or a more reacted liquid hydrocarbon product than in the prior art without sacrificing the yield and/or quality of the desired product. The predefined time in said reaction zone may according to an embodiment of the present invention be in the range 1 to 60 minutes such as 2 to 45 minutes, preferably said predefined time in said reaction zone is in the range 3 to 30 minutes such as in the range 3 to 25 minutes, more preferred in the range 4 to 20 minutes such as 5 to 15 minutes.

5. Cooling

The outlet stream from the reactor comprising liquid hydrocarbon product, water with water soluble organics and dissolved salts, gas comprising carbon dioxide, hydrogen, and methane as well as suspended particles from said converted carbonaceous material is subsequently cooled to a temperature in the range 80° C. to 250° C. such as in the range 100 to 200° C.; preferably the outlet stream from the reactor is cooled to a temperature in the range 120° C. to 180° C. such as to a temperature in the range 130° C. to 170° C. by heat exchange with the incoming feed mixture in the heat exchangers.

A preferred embodiment of the present invention is where said heat exchange is performed by indirect heat transfer via a heat transfer medium such as supercritical water, hot oil or molten salt. By use of such indirect heat transfer via a heat transfer medium it is obtained that both the feed mixture and the product mixture can flow inside tubes thereby allowing for easier cleaning. The heat transfer medium may optionally be further heated and/or be further cooled so as to allow for added controllability and flexibility of the heating and cooling. Said heat transfer medium may also be used for transfer of heat to/from other unit operations of the process such as e.g. the pre-treatment 1 and/or the upgrading part of a process according to the present invention.

6. Pressure Reduction

According to a preferred embodiment of the present invention, the pressurization system comprises two or more pressure de-amplifiers each comprising cylinders with a piston equipped with driving means for receiving a force to the piston such as shown and described in connection with FIG. 2-9. Advantageous driving means for the pistons in the cylinders according to the present invention include hydraulically driven means.

The cooled product mixture thereafter enters a pressure reducing device according to the present invention, where the pressure reduction unit comprises at least one inlet and an outlet, the pressure reduction unit being adapted to receive a pressurized fluid at process pressure level at the inlet, being adapted to isolate the received pressurized fluid from the upstream process and from the outlet and being adapted to reduce the pressure of the fluid to a lower predetermined level and further being adapted to output the fluid through the outlet while still isolated towards the upstream process.

In general pressure reduction unit comprises an actuated valve at the inlet and an actuated valve at the outlet and between the inlet valve and the outlet valve a de-pressurization device. Further a pressure reduction unit according to an embodiment of the present invention comprises means for measuring the pressure upstream the inlet valve, between the inlet valve and the outlet valve and downstream the outlet valve.

The pressure reduction unit according to the present invention may further comprise a pump unit having a cylinder and a piston as well as means for driving the piston inside the cylinder. Advantageously the pressure reduction unit further comprises a position indicator indicating the cycle position of the pressure reduction device and being adapted to provide a control signal for opening or closing at least one valve in the pressure reduction system.

In one embodiment the pressure reduction unit further comprises a control system, where the control system is adapted to allow opening of the valves when a certain maximum pressure difference is present on either side of the valve to be opened.

Often the pressure reduction system is operated so that the inlet valve after having allowed inflow of a feed stream is closed for a period before the outlet valve is opened, hereby allowing the pressure to be reduced in pressure reduction device.

In order to minimize the pressure loss over the inlet valve and thereby the wear, the outlet valve may be closed for a period before the inlet valve is opened, hereby allowing pressure to be generated in the pressure reduction device in a predefined way. The overlap of closed inlet and outlet valves corresponds to between 5 and 30% of the working cycle, preferably between 10 and 20% of the working cycle.

A pressure reduction arrangement according to the present invention, typically comprises two or more pressure reduction units being arranged in parallel and/or in series. The working cycles of the individual pressure reduction units of the pressure reduction arrangement be evenly distributed corresponding to the number of pressure reduction units.

Further the pressure reduction arrangement may include a position indicator each pressure reduction device, indicating the cycle position in the device and being adapted to provide a control signal for controlling the distribution of the pressure reduction unit cycles.

In general, the pressure in the high pressure processing system is reduced comprising entering a volume of pressurized fluid into a pressure reduction device closing the entry of pressurized fluid and expanding the entered volume to a desired pressure level by increasing the pressure reduction device volume, removing the fluid at the desired pressure level from the pressure reduction device by reducing the pressure reduction device volume.

The speed of the pump is in many applications of the present invention in the in the range 5-50 cycles per minute, preferably 5-25, most preferred 5-15 cycles per minute.

An advantageous embodiment of a pressure reduction device according to the present invention is where the pressure reduction pump is connected to a further pump that drives a pressurization of the energy absorption reservoir. For example the pressure reduction device further comprising an energy reservoir, where the pump is operatively connected to the reservoir and where the energy absorbed by the pump is converted and transferred to the reservoir for successive utilization. In a preferred embodiment a a pressurization pump is provided for supplying additional pressure to the input side of the pressurization equipment in order to compensate for loss of pressure energy in the system.

In a preferred embodiment, the energy reservoir drives a pressurization pump adapted to pressurize the feed mixture in the pressurization step (step 2 above) of the high pressure process. In one embodiment of the present invention, this is performed by a low pressure turbine connected to a generator generating electrical energy, and the electricity generated reduces the energy required to drive the pressurization pump in the pressurization step.

The surface area of the pistons according to the present invention is typically dimensioned so as to amplify the pressure i.e. the surface area of each end of the piston is dimensioned so as to obtain a predefined pressure ratio on each side of the piston. The ratio of surface area on the low pressure side of the piston to the surface area on the high pressure side of the piston may according to an embodiment of the present invention be in the range 1 to 20 such as in the range 1 to 10. Preferably the ratio of surface area on the low pressure side of the piston to the surface area on the high pressure side of the piston is in the range 1 to 3 such as in the range 1 to 2.

The pressure reducing device according to the present invention are typically designed for low stroke speeds (large stroke volume) thereby allowing for the use of actuated valves for filling and emptying of the cylinders rather than check valves. Preferred actuated valves according to the present invention include gate valves and ball valves or a combination thereof.

The stroke speed of the pistons according to an embodiment of the present invention may be from about 1 stroke per minute up to about 150 strokes per minute such as from about 5 strokes per minute up to about 100 strokes per minute. Preferably the stroke speed of the pistons are from about 10 to about 80 strokes per minute such as a stroke speed of the piston in the range 20 strokes per minute to about 60 strokes per minute. Besides allowing for the use of actuated valves the low stroke speed of the piston reduces the wear on pistons, seals and valve seats.

Often the pressure amplifiers according to the present invention are further designed as double acting pistons as shown in FIG. 1.

The pressure reducing unit according to an embodiment of the present invention are further designed so as to maximize the cleaning effect of the piston by minimization of the dead space in the cylinder.

Still further the pressure amplifiers may be equipped with positioners to monitor and control the position of the piston at any given moment. The piston positioners are preferably incorporated into the cylinder rod. The positioners are used to control the position of the piston. The positioners of the pressure cylinders may also be used to extract a flow measurement of media being pressurized by the both individual cylinder and the pressurization system i.e. the volumetric flow rate of the individual cylinder is given by the stroke volume multiplied by the number of strokes over a given time interval, and the same total volumetric flow rate may be extracted as the sum of the volumetric flow measurements of the individual cylinders.

The positioner(-s) according to the present invention may further be used for synchronization of the strokes of the individual pressure de-amplifiers e.g. when the product in a cylinder is being de-pressurized, another cylinder(s) is being charged with product mixture. After the cylinder has been charged, the cylinder is pre-pressurized to a pre-defined level by initiating the stroke with the valve towards the process closed. When the first cylinder has reached a certain stroke length, the actuated valve towards the process is closed and the equivalent valve towards the process for the next cylinder with pressurized product mixture to be de-pressurized is opened. By applying such sequence according to an embodiment of the present invention the pressure drop over the actuated valve towards the process and consequentially valve wear and pressure fluctuations are minimized. The pressure fluctuations may be further reduced by the use of at least 2 and preferably 3 or more pressure reducing units in a parallel arrangement according to a preferred embodiment of the present invention. The control of the individual pressure reducing units may be adapted so they are operated in a sequential manner to damp and minimize pressure fluctuation when switching from one pressure de-amplifier to the next.

For many embodiments of the present invention, where 3 or more cylinders are present these are equipped with sealing means such as double valves so that an individual cylinder can be sealed off and safely exchange an individual cylinder, while other cylinders are kept operating. A more robust, easy to maintain pressurization arrangement having a high availability is hereby obtained.

Reverse pump cylinder 1 is filled through V1 until cylinder has reached a given stroke that allows media to decompress by moving cylinder piston further towards end of stroke. Before moving piston to end of stroke, V1 closes.

After decompression V2 opens and the hydraulic cylinder presses the decompressed fluid out of the cylinder to phase separation. Cylinder 1 does not empty completely as it is necessary to withhold enough fluid to pressurize to process pressure by compression with V2 closed.

The reason is to avoid pressure drop across V1 when it is time to reopen for next filling.

Similarly when V1 closes, V3 opens. Before V3 can open the remaining fluid from the latter stroke is pressurized to prevent excessive wear of valve seats. The inlet temperature to the pressure de-amplifying cylinders is generally in the range from about 10° C. to about 250° C. such as from about 20° C. to about 220° C.; preferably the inlet temperature to the pressure de-amplifying cylinders is in the range from about 50° C. to about 210° C. such as from about 80° C. to about 200° C.; even more preferably the inlet temperature to the pressure amplifying cylinders is in the range from about 100° C. to about 180° C. such as from about 120° C. to about 170° C.

For applications according to the present invention, where the temperature exceeds about 120° C. such as about 140° C., the cylinders may further be equipped with means for cooling the seals of piston in order to withstand the operating conditions as shown and described in connection with FIG. 9 above.

7. Separation

The depressurized mixture from said pressure reduction containing liquid hydrocarbon product is subsequently lead to separation. The separation may according to the present invention comprise means for separating gas from said mixture. Said separation means may comprise a flash separator or degasser, wherein gas is withdrawn from the top. According to an embodiment of the present invention said gas may be used to produce heat for heating in the process to the process as shown in the figure and further described above. The gas may optionally be cooled to condense compounds such as e.g. water prior to said use to produce heat for heating in the process.

A particularly preferred embodiment according to the present invention includes a system where the converted feed mixture/product mixture is first cooled to a temperature of 60 to 250° C., expanded to a pressure in the range from about 15 to about 150 bars such as in the range from about 50 to about 120 bars and led to a phase separator/degasser for separation of the product mixture into at least a gas phase and residual phase. Preferably the separated gas phase is first cooled to a temperature in the range 80 to about 200° C., expanded to a pressure in the range 60 to 110 bars such as in the range 70 to 100 bars and led to a phase separator/degasser for separation of the converted feed mixture/product mixture into at least a gas phase and a residual phase.

As further exemplified below, the gas phase often comprises carbon dioxide, hydrogen, carbon monoxide, methane, ethane, ethane, propane, iso-propane, butane, iso-butane, water, methanol, ethanol, acetone.

An advantageous embodiment of the present invention includes extracting/separating hydrogen from the separated gas phase and introducing it into said process for upgrading of the hydrocarbons (optional step 8)

An embodiment of the present invention comprises extracting/separating hydrogen from the separated gas phase by a membrane gas separation technique. Another embodiment of the present invention comprises extracting/separating hydrogen using a pressure swing adsorption technique. A further embodiment of the present invention comprises extracting/separating hydrogen from said separated gas phase by the steps of:

separating the converted feed mixture/product mixture into a gas phase and a residual phase
cooling the separated gas to a temperature in the range from about 31 to 50° C. and separating the cooled gas phase into a condensed phase substantially free of hydrogen and a residual gas phase enriched in hydrogen and carbon dioxide in a phase separator,
further cooling the separated gas phase to a temperature in the range from about 10 up to about 31° C. and separating the cooled residual gas phase into a liquid phase comprising $CO_2$ and a residual gas phase enriched in hydrogen in a separator.
introducing the hydrogen enriched gas in the upgrading process after the pressurization step.

The separating means may further provide at least a coarse separation of the degassed mixture into a liquid hydrocarbon rich stream and residual water rich stream e.g. by gravimetric separation in a 3-phase separator.

The water rich stream comprising water soluble organics, suspended particles and dissolved salts may be at least partly withdrawn from said gravimetric separator, and fed to a recovery unit, optionally after further separation by gravimetric means filtering and/or centrifugation to remove suspended particles.

The degassed mixture or optionally the liquid hydrocarbon rich stream, is withdrawn from said gas separating means, and may be further separated e.g. the liquid hydrocarbon rich stream may be required to be efficiently dehydrated and/or desalted/deashed before being introduced into the upgrading part of the process.

In many aspects of the present invention said further separation comprises one or more gravimetric separation step(-s) optionally equipped with means for coalescing oil or water droplets such as one or more electrostatic coalescing steps. In other aspects of the present invention said further separation may include separation in one or more centrifugation step(-s) such as separation in one or more 3-phase centrifuges such as one or more high speed disc bowl centrifuges and/or one or more decanter centrifuges.

Often the operating temperature of the further separation is selected so as to obtain a dynamic viscosity of the liquid hydrocarbon product in the range from about 1 to about 30 centipoise during said further separation such as in the range from about 1 to about 25 centipoise during said further separation, preferably the temperature of the separation is selected so as to obtain a dynamic viscosity in the range from about 1 to about 20 centipoise such as in the range 5 to 15 centipoise.

The operating temperature of said further separation may according to an embodiment of the present invention be in the range 80 to 250° C. such as in the range 120 to 200° C., preferably at least the first of said further separation is operating at a temperature in the range 130 to 180° C. such as a temperature in the range 150-170° C.

The operating pressure of said further separation may according to an aspect of the present invention be in the range 10 to 120 bar, such as in the range 15-80 bars, preferably said further separation is operating at a pressure in the range 25 to 50 bar, such as in the range 30-50 bars.

Many aspects of the present invention relates to the use of one or more phase separators, where the residence time in each of the phase separators is in the range 1-30 minutes such as in the range 1 to 20 minutes, preferably the residence time in each of the separators are in the range 2 to 15 minutes.

In a further aspect of the present invention a viscosity reducing agent may be added to the converted feed mixture before and/or during the further separation. The viscosity reducing agent may often be an organic solvent having a boiling point below 200° C. such as below 150° C., preferably below 140° C. such as below 130° C.

The weight ratio of the viscosity reducing agent added to the amount of renewable oil may according to many embodiments of the present invention be in the range 0.01 to 2 such as in the range 0.05 to 1, preferably the weight ratio of the viscosity reducing agent added to the amount of low sulphur oxygen containing renewable oil is in the range 0.1 to 0.5 such as in the range 0.1 to 0.4. More preferably the weight ratio of the viscosity reducing agent added to the amount of low sulphur oxygen containing renewable oil is in the range 0.2 to 0.4 such as in the range 0.2 to 0.35.

A particularly preferred embodiment is where the viscosity reducing agent comprises at least one ketone such as Methyl Ethyl Ketone (MEK) and/or 2-heptanone and/or 2,5 dimethyl-cyclo-pentanone or a combination thereof.

Advantageously the viscosity reducing agent comprises a fraction of the low oil and is recovered down stream of said further separation step and prior to providing the low sulphur oxygen containing renewable oil to said optional upgrading step.

According to a preferred embodiment of the present invention the viscosity reducing agent is recovered in an evaporation step operating at a temperature in the range 100-200° C. such as in the range 100-160° C., preferably the viscosity reducing agent is recovered in an evaporation step operating at a temperature in the range 100-150° C. such as in the range 100-130° C.

A particular preferred embodiment of the present invention is where the viscosity reducing agent is substantially recovered in one or more flash distillation step(-s) producing a low sulphur containing oil phase and a distillate phase, and where the flash temperature is in the range 100-200° C. such as in the range 100-160° C., preferably the viscosity reducing agent is recovered in the flash distillation step producing a low sulphur containing oil phase and a distillate phase, where the flash temperature is in the range 100-150° C. such as in the range 100-130° C.

A washing agent comprising water may according to another aspect of the present invention be added to the liquid hydrocarbon product before or during said further phase separation step in order to further control the salt/ash content of the oil before being introduced to the upgrading step according to the present invention. The washing agent comprising water may according to the present invention be introduced in several steps.

The weight ratio of the washing agent comprising water to oil may advantageously be in the range 0.05 to 5.0 such as a weight ratio of the washing agent comprising water to the oil is in the range 0.05 to 3.0, preferably the of the washing agent comprising water to the oil is in the range 0.1 to 2.0 such as a weight ratio in the range 0.1-1.0.

The washing agent comprising water may according to an embodiment further comprise an acidification agent such as acetic acid or citric acid. The acidification agent may be added so as to obtain a pH of the water phase after separation of the washing agent comprising water in the range 2 to 7 such as a pH in the range 2.5 to 6.5, preferably the acidification agent is added so as to obtain a pH of the water phase after separation of the washing agent comprising water in the range 2.75 to 6 such as a pH in the range 3 to 5.5.

The further separation may according to an embodiment of the present invention further comprise one or more filtration step(-s) of the liquid hydrocarbon product. The filtration step may according to some preferred aspects of the present invention comprise the first step of the further separation and/or the filtration step may be a final step before optionally introducing the oil to an upgrading process according to an embodiment of the present invention.

8. Recovery

The water phases from the gas separating means, and further separation means are fed to a recovery device, where liquid organic compounds in the form of water soluble organics and/or homogeneous catalysts are recovered in a concentrated form, and recycled to into the feed mixture preparation device 1. As mentioned above under 1. Preparation the water soluble organics present in said water phase comprise a complex mixture of hundreds of different compounds including one or more compounds of ketones, alcohols and poly alcohols, phenols and alkylated phenols, carboxylic acids, furans, alkanes, alkenes, toluene, cumene etc.

Preferably said recovery device, comprises one or more evaporation step(-s), wherein water is evaporated from said combined water phases, and thereby providing a distillate and a concentrate. The degree of concentrating is selected so as to provide a distillate amount that corresponds to the amount of water added with the carbonaceous material, homogeneous catalyst and make up base in the pre-treatment. Typically the ratio of concentrate to the combined water phases entering the recovery unit is typically in the range from about 0.1 to about 0.9 such as in the range 0.2 to 0.8. Often the ratio of concentrate to the combined water phases entering the recovery unit is in the range from about 0.25 to about 0.7 such as in the range 0.3 to 0.6. In other embodiments of the present invention the ratio of concentrate to the combined water phases entering the recovery unit is typically in the range from about 0.25 to about 0.6 such as in the range 0.3 to 0.6.

The combined water phases may be preheated to a temperature of e.g. 70-130° C. such as a temperature in the range 80 to 115° C. before entering into said evaporator. The heat for said preheating is preferably provided by heat recovery from a process stream and/or from the outgoing distillate stream before entering into the evaporator. In the evaporator, water is evaporated from said mixture comprising water soluble organics and dissolved salts at a temperature from about 100 to about 115° C. In these cases the heat recovery from said process stream may be performed via a heat transfer medium such as a hot oil.

The pH of the combined water phase entering the recovery is according to the present invention preferably maintained at alkaline conditions such as in the range 7 to 14 such as a pH in the range 8 to 12, preferably the pH of the water phase to the recovery unit is maintained in the range 8 to 11. Operating at such inlet pH to the recovery unit has the advantage of reducing the amount of phenolics in the distillate.

An embodiment of said recovery step according to the present invention is where the recovery step comprises one or more flash step(-s).

A preferred embodiment of said recovery step according to the present invention is where the recovery step comprises evaporation in two or more steps operating at a decreasing pressure and temperature and each being heated with the evaporated vapor from the foregoing step to minimize the heat required for the evaporation.

The evaporator may advantageously further comprise condensing said evaporated vapor in two or more condensation steps, where the condensation temperatures in said condensation steps are decreasing so as to obtain a fractionation of the evaporated fraction i.e. a fraction comprising water and eventually higher boiling compounds, and a fraction where compounds having a boiling point temperature lower than water are concentrated.

Preferably said evaporated vapor passes a demister and/or a foam breaker prior to condensation of said evaporated fraction by cooling. Advantageously the evaporator may according to the present invention further be equipped with a coalescer an absorber, where the evaporated fraction is contacted with an absorbent. Said absorbent comprises in a particularly preferred embodiment a base such as sodium hydroxide.

The evaporator according to the present invention may in some embodiments include increasing the condensation temperature of said evaporated water by increasing the pressure by a blower, compressor (Mechanical Vapor Recompression) or a steam jet ejector (Thermal Vapor Recompression) or a combination thereof. Thereby the evaporated water vapor can be used as a heating medium for the evaporation in said evaporator, and said evaporator becomes very energy efficient as the latent heat of evaporation does not need to be supplied to said evaporation step.

It should be noted that said condensers according to the present invention may comprise heat exchangers where the media to be concentrated are evaporated on the other side, but in general said evaporation step according to the present invention comprises at least one additional condenser compared to the number of evaporation steps.

The fraction comprising evaporated water ("distillate") may further be cooled to a temperature suitable for discharge in a cooler. Hereby, it is obtained that said evaporator besides recovering said liquid organic compounds and/or homogenous catalysts also cleans and purifies the water phase in an efficient manner, and can produce a water phase that may be reused or discharged to a recipient. Optionally the "distillate" may be subjected to one or more polishing steps. Said polishing steps may include a distillation and/or a stripping and/or an absorber and/or adsorber and/or a coalescing step and/or a membrane system such as reverse osmosis and/or a biological treatment system such as a bioreactor.

The fraction being concentrated with compounds having a boiling point lower than water may be mixed with the concentrate from said evaporator, and recycled to the feed mixture preparation step 1.

In many applications according to the present invention a bleed or purge stream is withdrawn from said concentrated water phase prior to recycling to the feed mixture preparation step 1 to prevent buildup of compounds such as chloride. The bleed stream may according to an embodiment of the present invention comprise up to about 40% by weight of the concentrated water phase from the recovery unit such as up to about 25% by weight of the concentrated water phase from the recovery unit. Preferably the bleed stream comprises up to about 20% by weight of he concentrated water phase from the recovery unit such as up to about 15% by weight of the concentrated water phase from the recovery unit. More preferably the the bleed stream comprises up to about 10% by weight of the concentrated water phase from the recovery unit such as up to about 5% by weight of the concentrated water phase from the recovery unit. The bleed stream may be disposed off. However, in many applications according to the present invention the bleed stream is further treated.

The concentrated water phase from the recovery unit typically has a positive heating value.

A preferred application according to the present invention comprises further treating the bleed stream by combustion and/or co-combustion in a boiler or incinerator. Optionally the bleed stream is further concentrated prior to said combustion and/or co-combustion.

A particularly preferred embodiment of the present invention comprises further treating the bleed stream in an ion exchange step. The concentrated water phase from the recovery unit may be filtered to remove eventual solids prior to entering said ion exchange step according to the present invention.

The ion exchange step may according to a preferred embodiment of the present invention comprise one or more ion exchange steps such as one or more ion exchange resin(-s) contained in one or more fixed beds. Said one or more ion exchange steps may be arranged with one or more fixed bed(-s) in parallel and/or one or more fixed bed(-s) in series.

An advantageous embodiment of the present invention comprises further treating the bleed stream comprises at least two fixed bed(-s), each containing a chloride selective ion exchange resin capable of selectively adsorbing chloride from said concentrated water phase from said recovery unit and arranged valves in a parallel arrangement so that at least one ion exchange bed is online and at least one ion exchange bed is offline. Hereby continuous operation is ensured and chloride removal can be continued in the ion exchange bed(-s) being online while ion exchange bed(-s) being offline can be cleaned. Said cleaning may according to an embodiment of the present invention be performed by a back flow or back flushing of the ion exchange bed(-s) by demineralized water such as distillate water from the recovery unit. The present invention includes a valve arrangement and/or control system allowing for such cleaning or regeneration by back flow or back flush with demineralized water.

Typically the chloride removal in said ion exchange step according to the present invention is at least 50% of the chlorides in the concentrated water phase entering said ion exchange step such as a chloride removal of at least 60%. In many embodiments according to the present invention the chloride removal in said ion exchange step according to the present invention is at least 70% of the chlorides in the concentrated water phase entering said ion exchange step such as at least 80%. The chloride depleted stream from said chloride ion exchange step is preferably recycled to the feed mixture preparation step 1.

Further, in many embodiments according to the present invention the amount of homogeneous catalyst(-s) in the form of potassium and/or sodium such as being retained in said chloride depleted outlet stream from said chloride ion exchange step is at least 70% by weight of the amount entering said chloride ion exchange step such as at least 80% by weight. Preferably, the amount of homogeneous catalyst(-s) in the form of potassium and/or sodium such as being retained in said chloride depleted outlet stream from said chloride ion exchange step is at least 85% by weight of the amount entering said chloride ion exchange step such as at least 90% by weight. Hereby, less make up homogeneous catalyst is required to be added in the pretreatment step 1, and a more economical process is obtained for providing crude oil to the upgrading process according to the present invention, and thereby an overall more efficient and economical process is obtained.

9. Upgrading (Optional)

The crude oil produced in step 1 may be optionally be further subjected to an upgrading step to finished transportation fuels, lubricants and/or finished fuels.

The invention claimed is:

1. A pressure reduction unit for use in processing equipment handling high pressure fluid, where the pressure reduction unit comprises at least one inlet and an outlet, the pressure reduction unit being adapted to receive a pressurized fluid at process pressure level at the inlet, being adapted to isolate the received pressurized fluid from the upstream process and from the outlet and being adapted to reduce the pressure of the fluid to a lower predetermined level and further being adapted to output the fluid through the outlet while still isolated towards the upstream process, where the unit comprises a valve at the inlet and a valve at the outlet and between the inlet valve and the outlet valve a de-pressurization device, where sensors are provided for measuring the pressure upstream the inlet valve, between the inlet valve and the outlet valve and downstream the outlet valve and further comprising a control system, where the control system is adapted to allow opening of the valves when a certain maximum pressure difference is present on either side of the valve to be opened.

2. The pressure reduction unit according to claim 1, where the de-pressurization device comprises a pump unit having a cylinder and a piston driven inside the cylinder.

3. The pressure reduction unit according to claim 2, where a position indicator is provided indicating a cycle position of the piston and being adapted to provide a control signal for opening or closing at least one valve in the pressure reduction unit.

4. The pressure reduction unit according to claim 3, where the unit comprises the de-pressurization device comprising a pump unit having a cylinder and a piston as well as means for driving the piston inside the cylinder.

5. The pressure reduction unit according to claim 3, where the inlet valve after having allowed inflow of a feed stream is closed for a period before the outlet valve is opened, hereby allowing the pressure to be reduced in the de-pressurization device.

6. The pressure reduction unit according to claim 2, where channels or conduits for cooling fluid are provided in the piston and being adapted to keep the temperature of the piston at or below a predetermined level.

7. The pressure reduction unit according to claim 2, where the inlet valve after having allowed inflow of a feed stream is closed for a period before the outlet valve is opened, hereby allowing the pressure to be reduced in the de-pressurization device.

8. The pressure reduction unit according to claim 1, where the inlet valve after having allowed inflow of a feed stream is closed for a period before the outlet valve is opened, hereby allowing the pressure to be reduced in the de-pressurization device.

9. The pressure reduction unit according to claim 8, where the overlap of closed inlet and outlet valves corresponds to between 5 and 30% of a working cycle.

10. The pressure reduction unit according to claim 1, where the outlet valve is closed for a period before the inlet valve is opened, hereby allowing pressure to be generated in the de-pressurization device.

11. A pressure reduction arrangement comprising two or more pressure reduction units according to claim 1, the pressure reduction units being arranged in parallel and/or in series.

12. The pressure reduction arrangement according to claim 11, where working cycles of the pressure reduction units are distributed evenly corresponding to the number of pressure reduction units.

13. The pressure reduction arrangement according to claim 12, where a position indicator is provided for a de-pressurization device, indicating a cycle position in the device and being adapted to provide a control signal for controlling a distribution of the pressure reduction unit cycles.

14. The pressure reduction arrangement according to claim 11, further comprising an energy reservoir, where the de-pressurization device of one of the pressure reduction units is operatively connected to the reservoir and where the energy absorbed by the de-pressurization device is converted and transferred to the reservoir for successive utilization.

15. The pressure reduction arrangement according to claim 14, where the energy reservoir is a pressurized fluid chamber, that drives a pressurization device adapted to pressurize the fluid on the input side of the processing equipment.

16. The pressure reduction arrangement according to claim 15, where a pressurization pump is provided for supplying additional pressure to the input side of the processing equipment in order to compensate for loss of pressure energy in the system.

17. The pressure reduction arrangement according to claim 14, where the energy reservoir drives a low pressure turbine connected to a generator generating electrical energy.

18. A high pressure processing equipment, comprising a pressure reduction unit according to claim 1, or a pressure reduction arrangement comprising two or more such pressure reduction units, the pressure reduction devices being arranged in parallel and/or in series.

19. A method for reducing the pressure in a high pressure processing system, the method comprising entering a volume of pressurized fluid into a pressure reduction device while an outlet of the pressurized fluid is closed via a first valve, closing the entry of pressurized fluid via a second valve and expanding the entered volume to a desired pressure level by increasing the pressure reduction device volume while the outlet remains closed, removing the fluid at the desired pressure level from the pressure reduction device by reducing the pressure reduction device volume while the outlet is opened by operation of the first valve,
  wherein said increasing and reducing of the pressure reduction device volume is performed independent of the first and second valves, by operation of a cylinder piston rod in said pressure reduction device.

20. The method according to claim 19, where a the speed of a pump in the pressure reduction device is in the range 5-50 cycles per minute.

\* \* \* \* \*